(12) United States Patent
Wang et al.

(10) Patent No.: US 12,314,471 B2
(45) Date of Patent: May 27, 2025

(54) HEAD-MOUNTED DISPLAY WITH HAPTIC OUTPUT

(71) Applicant: Apple Inc., Cupertino, CA (US)

(72) Inventors: Forrest C. Wang, Petaluma, CA (US); Ritu Shah, Mississauga (CA)

(73) Assignee: APPLE INC., Cupertino, CA (US)

( * ) Notice: Subject to any disclaimer, the term of this patent is extended or adjusted under 35 U.S.C. 154(b) by 449 days.

(21) Appl. No.: 17/011,389

(22) Filed: Sep. 3, 2020

(65) Prior Publication Data

US 2021/0081047 A1 Mar. 18, 2021

Related U.S. Application Data

(60) Provisional application No. 62/900,051, filed on Sep. 13, 2019.

(51) Int. Cl.
| | |
|---|---|
| *G06F 3/16* | (2006.01) |
| *F16M 13/04* | (2006.01) |
| *G06F 3/01* | (2006.01) |
| *G06F 3/14* | (2006.01) |
| *G09B 5/06* | (2006.01) |
| *G09B 19/00* | (2006.01) |

(52) U.S. Cl.
CPC ............ *G06F 3/016* (2013.01); *F16M 13/04* (2013.01); *G06F 3/012* (2013.01); *G06F 3/14* (2013.01); *G06F 3/16* (2013.01); *G09B 5/06* (2013.01); *G09B 19/003* (2013.01)

(58) Field of Classification Search
CPC .................................................. G06F 3/016
USPC ............. 386/227; 345/173; 348/836; 463/36
See application file for complete search history.

(56) References Cited

U.S. PATENT DOCUMENTS

| | | | |
|---|---|---|---|
| 8,747,196 B2 * | 6/2014 | Rosenberg | A63F 13/10 |
| | | | 463/36 |
| 9,448,407 B2 | 9/2016 | Kimura | |
| 9,846,308 B2 | 12/2017 | Osterhout | |
| 9,875,406 B2 | 1/2018 | Haddick et al. | |
| 9,908,048 B2 | 3/2018 | Osman et al. | |
| 10,173,129 B2 | 1/2019 | Mikhailov et al. | |
| 10,318,007 B2 | 6/2019 | Lee et al. | |

(Continued)

FOREIGN PATENT DOCUMENTS

| | | |
|---|---|---|
| CN | 105547318 A | 5/2016 |
| JP | 6526721 B2 | 6/2019 |
| WO | 2017143128 A1 | 8/2017 |

OTHER PUBLICATIONS

Zeng, T., et al., "Eye-around vibration haptics on VR immersion improvement", Virtual Reality & Intelligent Hardware, www.vr-ih.com, Received Apr. 2019, (9 pp).

(Continued)

*Primary Examiner* — Ruay Ho
(74) *Attorney, Agent, or Firm* — Young Basile Hanlon & MacFarlane, P.C.

(57) ABSTRACT

A head-mounted display includes a display, haptic output devices, and a controller. The display unit is configured to be worn on a head of a user and includes a display for providing graphical output to the user. The haptic output devices are coupled to the display unit. The controller that processes directional inputs, determines directional haptic output according to the directional inputs, and controls the haptic output devices to provide the directional haptic output.

10 Claims, 12 Drawing Sheets

(56) References Cited

U.S. PATENT DOCUMENTS

| | | | |
|---|---|---|---|
| 2004/0097839 | A1 | 5/2004 | Epley |
| 2014/0118631 | A1* | 5/2014 | Cho ................ G06F 3/167 348/836 |
| 2014/0122085 | A1 | 5/2014 | Piety et al. |
| 2014/0306891 | A1 | 10/2014 | Latta et al. |
| 2015/0189223 | A1* | 7/2015 | Levesque ............ G02B 27/017 386/227 |
| 2015/0293592 | A1* | 10/2015 | Cheong ................ G06F 1/163 345/173 |
| 2015/0323993 | A1 | 11/2015 | Levesque et al. |
| 2017/0010671 | A1* | 1/2017 | Ghaffari Toiserkan ............... B25J 9/1676 |
| 2017/0045941 | A1* | 2/2017 | Tokubo ................ A63F 13/25 |
| 2017/0153672 | A1 | 6/2017 | Shin et al. |
| 2017/0337737 | A1* | 11/2017 | Edwards ............... F16M 13/04 |
| 2018/0284894 | A1 | 10/2018 | Raut et al. |
| 2018/0286134 | A1* | 10/2018 | Warhol ................. G06F 3/011 |
| 2019/0101986 | A1* | 4/2019 | Khoshkava ........... H01L 41/187 |
| 2019/0163271 | A1* | 5/2019 | Heubel ................ A63F 13/285 |
| 2019/0200920 | A1* | 7/2019 | Tien ..................... G16H 50/20 |
| 2019/0310706 | A1* | 10/2019 | Wang .................... G06F 3/016 |
| 2019/0324541 | A1* | 10/2019 | Rihn .................. G06F 3/04815 |
| 2020/0033601 | A1* | 1/2020 | Magrath ................ G06F 3/011 |
| 2020/0341538 | A1* | 10/2020 | Zhu ...................... A63H 33/102 |
| 2021/0041706 | A1* | 2/2021 | Hatfield ................ G06F 1/163 |
| 2021/0389829 | A1* | 12/2021 | Erivantcev ............ H02J 7/342 |

OTHER PUBLICATIONS

Reddit.com, Vive Comments, Haptic Feedback in Headset, <https://www.reddit.com/r/Vive/comments/52zkhq/haptic_feedback_in_headset/>, Author Unknown, Dated 2017 (10 pp).

Kaul, O. B., et al., "Concept for Navigating the Visually Impaired using a Tactile Interface around the Head", CHI 2019 Workshop on Hacking Blind Navigation, Publication: 2019, <https://hci.uni-hannover.de/papers/KaulChi2019_Workshop.pdf> (5 pp).

Bhaptics.com, "Meet Our Next Generation Wireless Haptic Suit", Aug. 3, 2019 <https://web.archive.org/web/20190803024553/https://www.bhaptics.com/> (11 pp).

VRS.org., "Head-Mounted Displays (HMDs)", What are Head-Mounted Displays?, Mar. 22, 2019, <http://web.archive.org/web/20190322090031/https://www.vrs.org.uk/virtual-reality-gear/head-mounted-displays/> (4 pp).

Feelreal.com, "Feelreal Sensory Mask", Jul. 27, 2019 <http://web.archive.org/web/20190727062535/https://feelreal.com/> (15 pp).

Ardouin, J., et al., "FlyVIZ: A Novel Display Device to Provide Humans with 360° Vision by Coupling Catadioptric Camera with HMD", Published 2012; Proceedings of the 18th ACM Symposium on Virtual Reality Software and Technology, ACM, New York, NY, USA, Vrst '12, 41-44 (4 pp).

HCI Group, Leibniz University of Hanover, "HapticHead: A Spherical Vibrotactile Grid around the Head for 3D Guidance in Virtual Augmented Reality", You Tube Video, https://www.youtube.com/watch?v=SVpYzQ_m20A&feature=youtu.be, 2017, (7 pp).

* cited by examiner

HEAD-MOUNTED DISPLAY WITH HAPTIC OUTPUT

CROSS-REFERENCE TO RELATED APPLICATION(S)

This application claims priority to and the benefit of U.S. Provisional Application No. 62/900,051 filed Sep. 13, 2019, the disclosure of which is incorporated by reference herein in its entirety.

TECHNICAL FIELD

The present disclosure relates to head-mounted displays and, in particular, outputs by head-mounted displays.

BACKGROUND

Head-mounted displays are worn on heads of users and provide graphical content and may also provide aural content to users thereof. Graphical content may include graphics of a conventional movie, a virtual environment of a game or simulator (discussed below), a productivity program (e.g., word processor or spreadsheet), among others. Aural content includes sounds, such as those occurring in the movie, the virtual environment, or the productivity program.

SUMMARY

In an implementation, a head-mounted display includes a display, haptic output devices, and a controller. The display unit is configured to be worn on a head of a user and includes a display for providing graphical output to the user. The haptic output devices are coupled to the display unit. The controller that processes directional inputs, determines directional haptic output according to the directional inputs, and controls the haptic output devices to provide the directional haptic output.

The haptic output devices may include a left haptic device and a right haptic device, with the directional haptic output including a left haptic output and a right haptic output. The controller may control the left haptic device to provide the left haptic output and the right haptic device to provide the right haptic output.

The directional inputs may include one or more of navigation instructions, an environmental feature of interest that is an object in an environment in which the head-mounted display is positioned, or a virtual output of interest that is at least one of the graphical output or an aural output of the head-mounted display.

In an implementation, a head-mounted display includes a display unit, haptic output devices, and a controller. The display unit is configured to be worn on a head of a user and includes a display for providing graphical content to the user. The haptic output devices are coupled to the display unit. The controller that processes a health input, determines a health haptic output according to the health input, and controls the haptic output devices to provide the health haptic output. The health input may be a breathing instruction or an exercise instruction for instructing the user.

In an implementation, a head-mounted display includes a display unit, a haptic output device, and a controller. The display unit is configured to be worn on a head of a user and includes a display for providing graphical content to the user. The haptic output devices is removably coupleable to the display unit and provides haptic output to the user. The controller the controls the haptic output device to provide the haptic output. The haptic output device may be removably coupled to the display unit mechanically and electrically.

DETAILED DESCRIPTION

Disclosed herein are embodiments of head-mounted displays, program modules thereof, and methods of use therefor, which utilize haptic output. Haptic output may be provided for various different purposes (e.g., to instruct a user and/or draw the users attention) and may, advantageously, be provided independent of graphical and/or aural content in some applications, so as to provide instructions or other output in a visually and/or aurally unobtrusive manner.

Figure 1A:
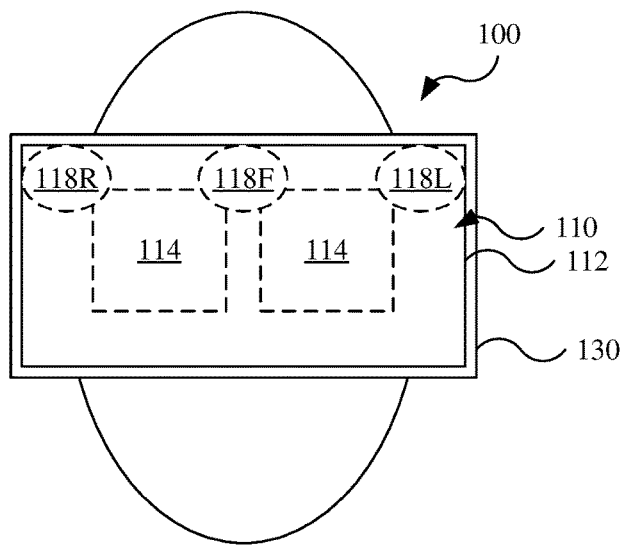
FIG. 1A is a front view of a head-mounted display on a head of a user.
Figure 1B:
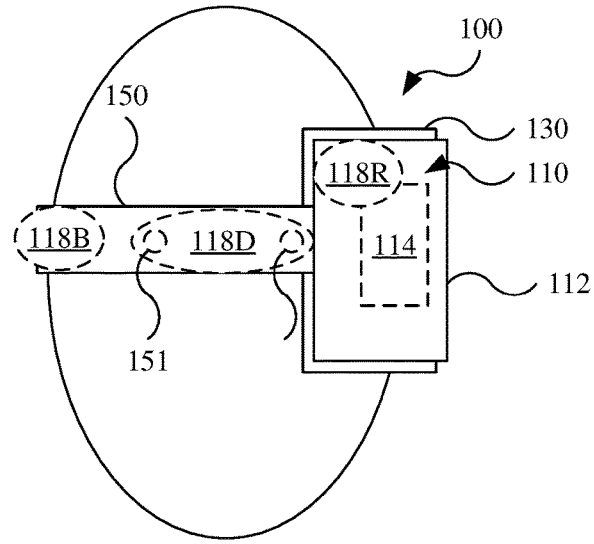
FIG. 1B is a right view of the head-mounted display of FIG. 1A on the head of the user.
Figure 1C:
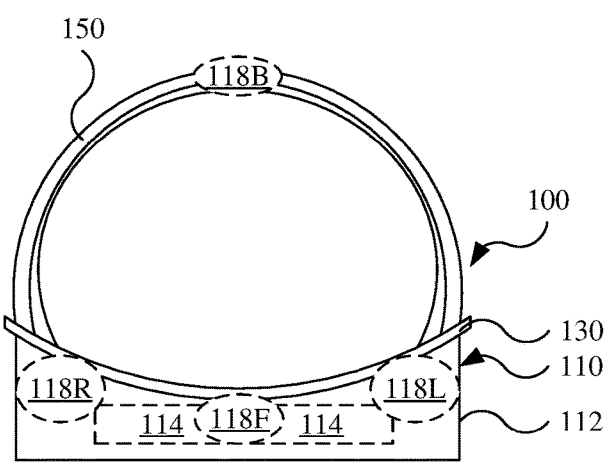
FIG. 1C is a top view of the head-mounted display of FIG. 1A on the head of the user.

Referring to FIGS. 1A-1C, a head-mounted display 100 generally includes a display unit 110, a facial support 130, and a head support 150. The head-mounted display 100 may also be referred to as an HMD, a display system, or a head-worn computer.

The display unit 110 is configured to be worn over the eyes of the user and provide graphical content thereto, which may be of a computer-generated reality (as discussed in further detail below). The display unit 110 generally includes a chassis 112 and one or more displays 114. The chassis 112 is the primary structure, such as a housing, that is configured to be supported on the face of the user and to which the one or more displays 114 are coupled. The one or more displays 114 may be hidden by the chassis 112 as is indicated with the displays 114 being illustrated in broken lines.

The one or more displays 114 output the graphical content to the user. The one or more displays 114 may be provided in any suitable number, such as one of the displays 114 for both eyes of the user, one of the displays 114 for each eye of the user, or multiple ones of the displays 114 for each eye. For simplicity, the one or more displays 114 are referred to hereafter singularly (i.e., as "the display 114"), but it should be understood that the display unit 110 may include more than one the displays 114. The display 114 may, for example, be a suitable display panel, such as a liquid-crystal display panel ("LCD"), light-emitting diode display ("LED"), a micro light-emitting diode display ("microLED" or "μLED"), or other type of display. In still further examples, the display 114 may be configured as a projector and a reflector (e.g., an opaque mirror or a transparent lens) that reflects projected light back to the eyes of the user, or a transparent display.

The facial support 130 engages the face of the user for supporting the display unit 110 thereon with the display 114 in suitable position for displaying the graphical content to the user. The facial support 130 may also function as a light seal to block or prevent environmental light from reaching eyes of the user. The facial support 130 is coupled to the display unit 110 and may, for example, be formed of one or more compliant materials that distribute force to allow the display unit 110 to be comfortably worn by the user. The facial support 130 may be removably coupled to the display unit 110, for example, with magnets, clips, male/female interfitting components, or any other suitable mechanisms that allows the user to remove, replace, and/or interchange the facial support 130 from the display unit 110. In some embodiments, the facial support 130 may include electronic components in which case, the facial support couples to the display unit 110 both mechanically and electrically (e.g., to send signals thereto, receive signals therefrom, and/or receive power therefrom).

The head support 150 engages the head of the user for supporting the display unit 110 thereon. The head support 150 may, for example, include a strap that is coupled to either side of the display unit 110 (i.e., left and right sides) and extends around the head of the user, so as to pull the display unit 110 and the facial support 130 against the face of the user. The head support 150 may be removably coupled to the display unit 110, for example, with magnets, clips, male/female interfitting components, or any other suitable mechanisms that allows the user to remove, replace, and/or interchange the head support 150 from the display unit 110. In some embodiments, the head support 150 may include electronic components in which case, the head support 150 couples to the display unit 110 both mechanically and electrically (e.g., to send signals thereto, receive signals therefrom, and/or receive power therefrom).

Figure 1D:
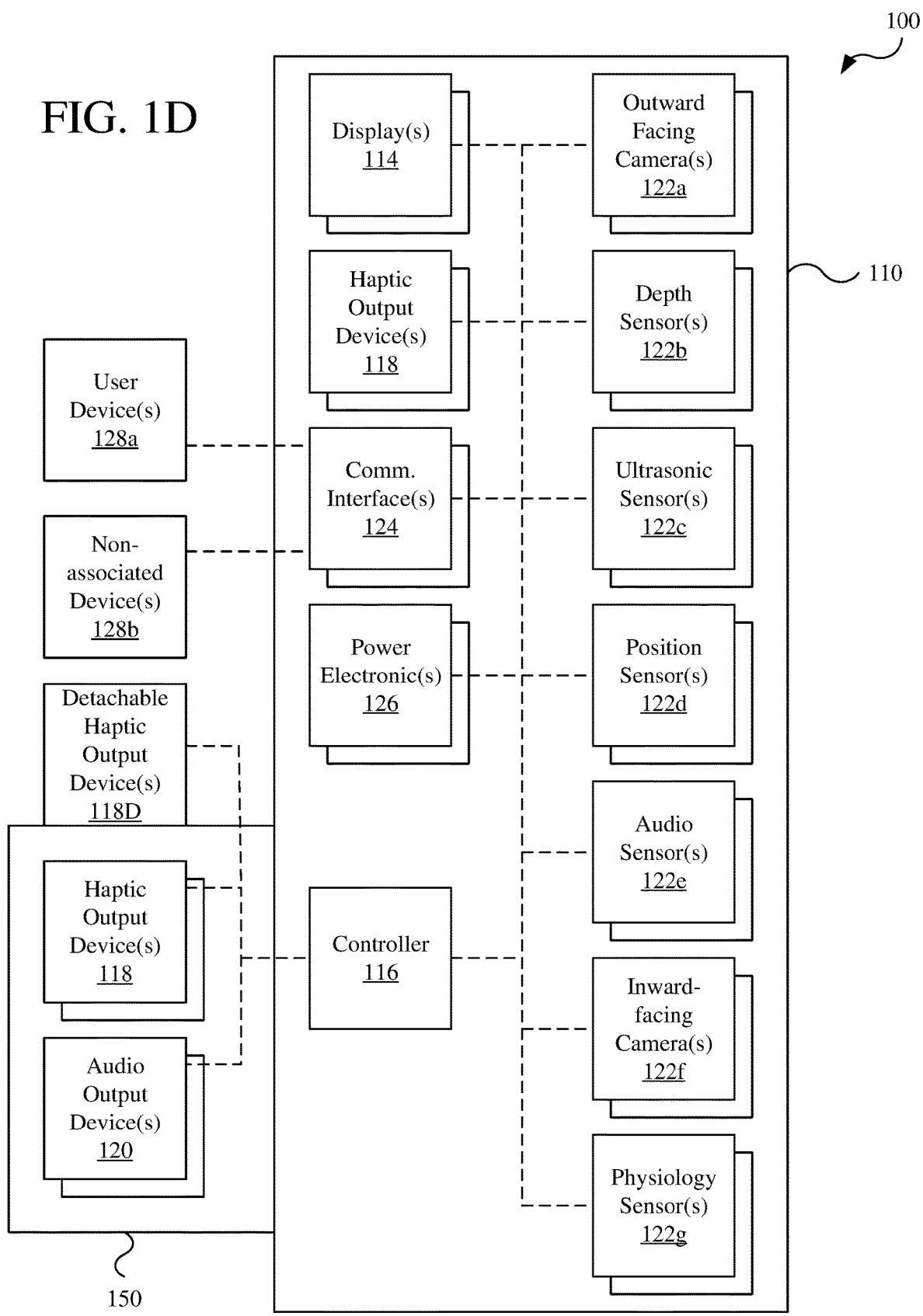
FIG. 1D is a schematic view of the head-mounted display of FIG. 1A.

Referring additionally to FIG. 1D, the head-mounted display 100 may, in addition to the display 114, also include various other electronics. The other electronics include one or more controllers 116 and one or more haptic output devices 118. The other electronics may also include one or more audio output devices 120, one or more sensors 122, one or more communications interfaces 124, and/or power electronics 126. As discussed in further detail below, these electronics may be provided with various portions of the head-mounted display 100 and/or locations relative to the user, such as with the display unit 110, the facial support 130, the head support 150, and/or remotely therefrom.

The controller 116 causes the display 114 to provide the graphical content, the haptic output devices 118 to provide haptic output, and the audio output devices 120 to provide audio output. The controller 116 may also control or otherwise communicate with other electronic components of the head-mounted display 100, such as the sensors 122 (e.g., controlling and/or receiving sensor signals therefrom) and the communications interfaces 124 (e.g., controlling and/or sending and receiving communications signals therefrom). The controller 116 executes stored software instructions by which various inputs are processed (e.g., from the user, the sensors 122, and the communications interfaces 124) for determining and causing output of the various output devices (e.g., the display 114, the haptic output devices 118, and the audio output device 120). The controller 116 may be coupled to the display unit 110 (e.g., being coupled to the chassis 112), the head support 150, or be provided remotely therefrom (e.g., being in wired or wireless communication with the other electronic components or intervening electronic devices).

Figure 2:
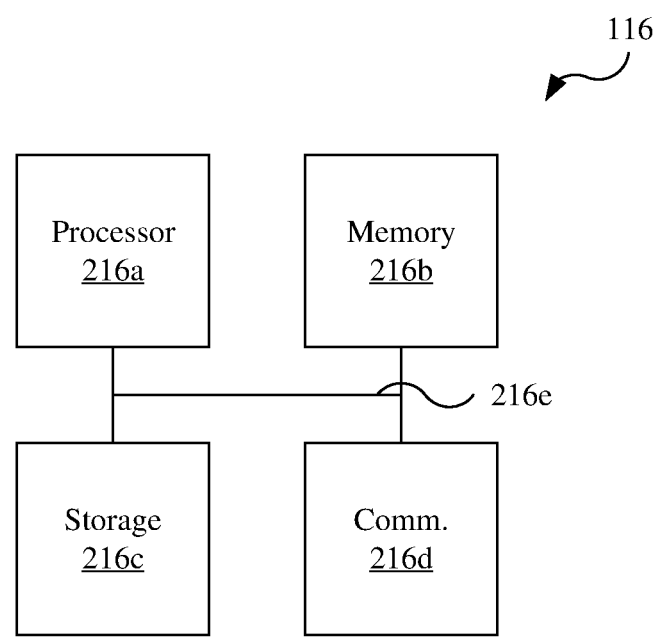
FIG. 2 is a schematic view of a hardware configuration of a controller shown in FIG. 1D.

Referring to FIG. 2, the controller 116 is a computing device capable of implementing the apparatus and methods described herein. In an example hardware configuration, the controller 116 generally includes a processor 216a, a storage 216b, a memory 216c, a communications interface 216d, and a bus 216e by which the other hardware components of the controller 116 are in communication with each other. The processor 216a may be any suitable processing apparatus, such as a processor or central processing unit ("CPU") capable of executing instructions (e.g., software programming). The storage 216b is a long-term, non-volatile storage device that stores instructions that are executed by the processor 216a, such as a hard disc drive ("HDD") or a solid state drive ("SSD"). The memory 216c is a volatile, short-term storage device, such as a random access memory module ("RAM"). The communications interface 216d allows the controller 116 to send signals (e.g., control signals for operating the displays 114, the haptic output devices 118, and/or the audio output devices 120) and receive signals (e.g., from the sensors 122, and/or the communications interface 124). While illustrated as a singular element, it should be understood that the head-mounted display 100 may include more than one controller and/or various sub-components of the controller may be provided in different locations. For simplicity herein, the controller 116 is referred to singularly but should be understood to include a system that includes multiple computing devices (e.g., controllers specifically associated with any of the electronic components described herein).

The one or more haptic output devices 118 of the head-mounted display 100 provide haptic output to one or more parts of the head of the user. Haptic output generally refers to output of the head-mounted display 100 that is perceived tactilely by the user (i.e., via the sense of touch). In particular, the one or more haptic output devices 118 of the head-mounted display 100 provide haptic output that is vibratory. As discussed in further detail below, such vibratory haptic output may be characterized by frequency, magnitude, location, directionality, and/or duration. The haptic output pattern for a given purpose may also vary by time or other considerations (e.g., location and user sensitivity among other considerations). A haptic output pattern refers to a combination of the frequency, the magnitude, the location, the directionality, and/or the duration. The haptic output of a given haptic output module (discussed below) may differ to communicate different information to the user, and the haptic output of different haptic output modules may have different haptic output patterns for the user to discern between different information communicated thereto.

The frequency of the haptic output pattern may refer to the frequency of the continual output of the haptic output device 118 and/or the frequency of pulsing (e.g., on/off sequence thereof). The magnitude of the haptic output pattern is the force applied by the haptic output device 118 to the user. The location of the haptic output pattern is the location of the haptic output device 118 relative to the user (e.g., left, right, front, back, top, or other head location). The directionality of the haptic output pattern is the direction of the force perceived by the user. The duration of the haptic output pattern refers to the time over which the haptic output pattern is provided. It should be noted that the frequency, magnitude, location, and directionality of a given haptic output pattern may vary over time or according to other considerations.

Furthermore, the haptic output may be provided alone or in conjunction with various other outputs. An isolated haptic output may be provided without any other output (e.g., graphical or audio) related thereto (e.g., based on a common input). An asynchronous combined output may include providing the haptic output and another output (e.g., graphical and/or audio) related thereto (e.g., based on a common input) asynchronously therewith (e.g., at different times). For example, an asynchronous combined output may begin with only the haptic output and, over time or as the input changes, add the graphical and/or audio output, which may be advantageous as a navigation haptic output, an environmental haptic output, and/or a virtual awareness haptic output (as discussed below). A simultaneous combined output may include providing the haptic output and another output related thereto simultaneously Each of the haptic output devices 118 may be any type of suitable device capable of outputting the vibratory haptic output, such as a linear resonant actuator ("LRA"), an eccentric rotating mass ("ERM"), a piezoelectric motor or other piezoelectric output device, or a servomotor. It should be noted that not all haptic output devices 118 may be capable of providing different characteristics of the haptic output pattern. For example, a haptic output device 118 may have only one magnitude, one location, and one direction, such that the individual haptic output device 118 may be varied only by frequency (e.g., on/off pulsing), while the haptic output pattern of multiple of such haptic output devices 118 may also vary by location (e.g., which of such haptic output devices 118 is operated).

Each of the haptic output devices 118 may be located in one or more different regions of the head-mounted display 100 to provide the haptic output (e.g., a same type of haptic output) to one or more different portions of the head of the user. As shown in FIGS. 1A, 1B, and 1C, in one specific example, the head-mounted display 100 includes four haptic output devices 118 at front, left, right, and back locations, which are depicted schematically. A front haptic device 118F provides haptic output to a forward part of the head of the user (e.g., a front haptic output to the forehead, as shown), a left haptic device 118L provides haptic output to a left part of the head of the user (e.g., a left haptic output to the left temple, as shown), a right haptic device 118R provides haptic output to a right part of the head of the user (e.g., a right haptic output to the right temple), and a rear or back haptic device 118B provides haptic output to a rear part of the head of the user (e.g., a back haptic output to the back of the head, as shown).

Each of the haptic output devices 118 may directly or indirectly contact the user (e.g., the skin or hair of the user) for providing the haptic output thereto. For example, the haptic output devices 118 may be covered by another material (e.g., of the facial support 130, the head support 150, or includes its own covering) through which the haptic output is sensed by the user.

In other embodiments, the haptic output devices 118 may be provided in fewer, more, and/or different locations. For example, the haptic output devices 118 may be provided in a subset of the front, left, right, and back locations (e.g., only left and right, only front and back, or without back). In another example, the haptic output devices 118 may, instead or additionally be provided in different locations, such as at or along a top of the head of the user, cheeks, nose, and/or at or along sides of the head of the user instead of or in addition to the temples of the user.

The haptic output devices 118 may provide the haptic output in a concentrated area (e.g., the front, left, right, and/or back, as shown). Instead or additionally, the haptic output devices 118 may, singularly or cooperatively, provide the haptic output over an elongated area. For example, when providing the haptic output along a location (e.g., the top or sides of the head), the haptic output may be provided over an elongated area (e.g., extending from front to back over a portion of the head of the user).

Each of the haptic output devices 118 may be coupled to the display unit 110, the facial support 130, and/or the head support 150. In the example shown in FIGS. 1A to 1C, the front haptic device 118F, the left haptic device 118L, the right haptic device 118R are coupled to the display unit 110 (e.g., providing haptic output through the facial support 130), while the back haptic device 118B are coupled to the head support 150.

Each of the haptic output devices 118 may be provided removably or irremovably with the head-mounted display 100 or the portion thereof to which the haptic output device 118 is coupled (e.g., with the display unit 110, the facial support 130, and/or the head support 150). When removably coupled, the haptic output device 118 is intended to be easily removed, replaced, and/or interchanged from the head-mounted display 100 by the user. For example, the haptic output device 118 may be removably coupled mechanically and electrically to the head-mounted display 100. The haptic output device 118 and the head-mounted display 100 (e.g., the display unit 110, the facial support 130, and/or the head support 150) may include complementary mechanical mating features and/or mechanisms (e.g., magnets, snaps, clips, and/or male/female interfitting structures) to form a mechanical coupling and may also include complementary electrical mating features (e.g., contacts, pogo pins, plugs and receptacle) that form an electrical connection (e.g., to send signals and/or power therebetween). The haptic output devices 118 that are removable may be provided as an optional peripheral that may be optionally coupled to the head-mounted display 100. In one example, a detachable haptic output device 118D is coupleable to the head support 150 on an interior surface thereof (e.g., using snaps 151 that function both to mechanically and electrically couple the detachable haptic output device 118D to the head support 150).

In the case of the haptic output device 118 being irremovable, the haptic output device 118 is configured to not be easily removable, replaceable, or interchangeable by a conventional user, but may be removed and/or replaced by a trained technician (e.g., for repair or replacement of the haptic output device 118 that is malfunctioning or non-operating).

In some embodiments, the head-mounted display 100 may include the haptic output devices 118 that are only not removable. In other embodiments, the head-mounted display 100 may include the haptic output devices that are both irremovable (e.g., in one or more locations on the display unit 110, such as to the forehead at a center location and/or additionally at left and right locations) and removable (e.g., being removably coupleable to the head support 150 at side and/or back locations).

Further uses and applications of the haptic output devices 118 are discussed below.

The audio output devices 120 of the head-mounted display 100 provide audio output. The audio output devices 120 include one or more speakers that may be configured, for example, as in-ear, on-ear, or over-ear headphones. The audio output devices 120 may, for example, be coupled, removably or irremovably, to the head support 150 (as shown in FIG. 1D) or any other suitable location (e.g., the display unit 110). Alternatively, the audio output devices 120 may be provided as a separate unit or system (e.g., headphones) that is usable both with head-mounted display 100 (e.g., being in wired or wireless communication therewith) and independent thereof (e.g., with another device).

The sensors 122 of the head-mounted display 100 monitor conditions of the environment and/or the user. Those sensors 122 that monitor the environment may include, but are not limited to, one or more outward-facing cameras 122a, one or more depth sensors 122b, one or more ultrasonic sensors 122c, one or more position sensors 122d, one or more audio sensors 122e. Those sensors 122 that monitor the user may include, but are not limited, one or more inward-facing cameras 122f and one or more physiological sensors 122g. As noted below, one or more of the environmental sensors may, by monitoring the environment, also monitor the user (e.g., position thereof and/or sound therefrom). The sensors 122 may be coupled to the display unit 110 as shown in FIG. 1D, but may be provided in any suitable location (e.g., the head support 150).

The outward-facing cameras 122a face outward from the head-mounted display 100 and monitor the environment therearound. The outward-facing cameras 122a may include two forward cameras (e.g., that face forward, such as generally from the perspective of the eyes of the user) and may further include one or more side cameras (e.g., that face left and right directions), one or more rear cameras, and/or one or more downward cameras (e.g., that face downward at the front, sides, and/or rear of the head-mounted display 100). The outward-facing cameras 122a may be any suitable type of camera including, but not limited to, RGB, gray scale, visible light, and infrared. The outward-facing cameras 122a, the controller 116, and/or other processing apparatus may be further capable of processing images captured by the outward-facing cameras 122a, for example, for object recognition and/or tracking, such as with suitable software known in the art.

The one or more depth sensors 122b detect objects in the environment around the head-mounted display 100 and/or distances thereto. The one or more depth sensors 122b may, for example, be a structured light system (e.g., having a projector and a camera) that projects light in a known pattern, senses the light reflected from objects in the environment, and identifies objects and/or distances thereto using suitable algorithms. The one or more depth sensors 122b may be provided in any suitable location (e.g., being forward-facing from the display unit 110). Detection with the depth sensors 122b may be performed in conjunction with the controller 116 or other suitable processing apparatus (e.g., of or associated with the depth sensors 122b themselves).

The one or more ultrasonic sensors 122c use ultrasonic signals to detect objects in the environment around the head-mounted display 100. The ultrasonic sensors 122c may detect objects not otherwise detected by the outward-facing cameras 122a and/or the depth sensors 122b. The ultrasonic sensors 122c may also detect objects using less computing and/or power resources than the outward-facing cameras 122a and/or the depth sensors 122b. The one or more ultrasonic sensors 122c may be provided any suitable location (e.g., being forward-facing from the display unit 110 and/or rearward-facing from the head support 150). Detection with the ultrasonic sensors 122c may be performed in conjunction with the controller 116 or other suitable processing apparatus (e.g., of or associated with the ultrasonic sensors 122c themselves).

The one or more position sensors 122d monitor the position, orientation, and/or movement of the head-mounted display 100 relative to the environment. With the head-mounted display 100 being worn by the user, the position sensors 122d may also and thereby monitor the position, orientation, and/or movement of the user (e.g., the head thereof). The position sensors 122d may include, but are not limited to, global positioning system sensor, a magnetometer, a gyroscope, accelerometers, and/or an inertial measurement unit (IMU). Detection with the position sensors 122d may be performed in conjunction with the controller 116 or other suitable processing apparatus (e.g., of or associated with the position sensors 122d themselves).

The one or more audio sensors 122e monitor sound of the environment, which may include sound produced by the user (e.g., audio commands). The audio sensors 122e may, for example, be microphones (mono or stereo). Detection with the audio sensors 122e may be performed in conjunction with the controller 116 or other suitable processing apparatus (e.g., of or associated with the audio sensors 122e themselves).

The one or more inward-facing cameras 122f monitor the user. In one example, the inward-facing cameras 122f monitor eyes of the user. The inward-facing cameras 122f, the controller 116, and/or other processing apparatus may be further capable of processing images capture by the inward-facing cameras 122f, for example, to identify the user, track eye movement of the user, and/or determine a position of the head-mounted display 100 (e.g., the display 114 thereof) relative to the user.

The one or more physiological sensors 122g monitor one or more physiological conditions of the user. Such physiological conditions may, for example, include heart rate, perspiration, and temperature, the physiological sensors 122g being of suitable type for monitoring thereof. The physiological sensors 122g may be provided in any suitable location, such as the display unit 110, the facial support 130, and/or the head support 150. Detection with the physiological sensors 122g may be performed in conjunction with the controller 116 or other suitable processing apparatus (e.g., of or associated with the physiological sensors 122g themselves).

The power electronics 126 supply power to the various other electronic components of the head-mounted display 100. The power electronics 126 may, for example, include one or more batteries. The power electronics 126 may be provided in any suitable location, such as the display unit 110 (as shown in FIG. 1D) and/or the head support 150. Power delivery from the power electronics 126 to other electronic components may be performed in conjunction with the controller 116 or other suitable processing apparatus (e.g., of or associated with the power electronics themselves themselves), such as when operating such other electronics (e.g., for output and/or sensing).

The communications interface 124 sends and/or receives signals from devices external to the head-mounted display 100. Such external devices may include a user device 128a, which may function as user input device to the head-mounted display 100. The user device 128a may, for example, be a specific control device for the head-mounted display 100 (e.g., being configured for particular use with the head-mounted display 100 or software thereof). Instead or additionally, the user device 128a may be a multi-purpose device, such as a smartphone, that has capabilities and uses independent of the head-mounted display 100. The user device 128a may additionally provide further functionality and/or capabilities to the head-mounted display 100. For example, the user device 128a may include a cellular modem that the head-mounted display 100 may lack, such that cellular communications may be received by that user device 128a and subsequently transferred to the head-mounted display 100 via the communications interface 124 thereof. The external device may be a non-associated device 128b that is not specifically associated with the user or the head-mounted device 128. For example, the non-associated device 128b may be another head-mounted display 100, smartphone, or other communications device associated with another person.

Figure 3:
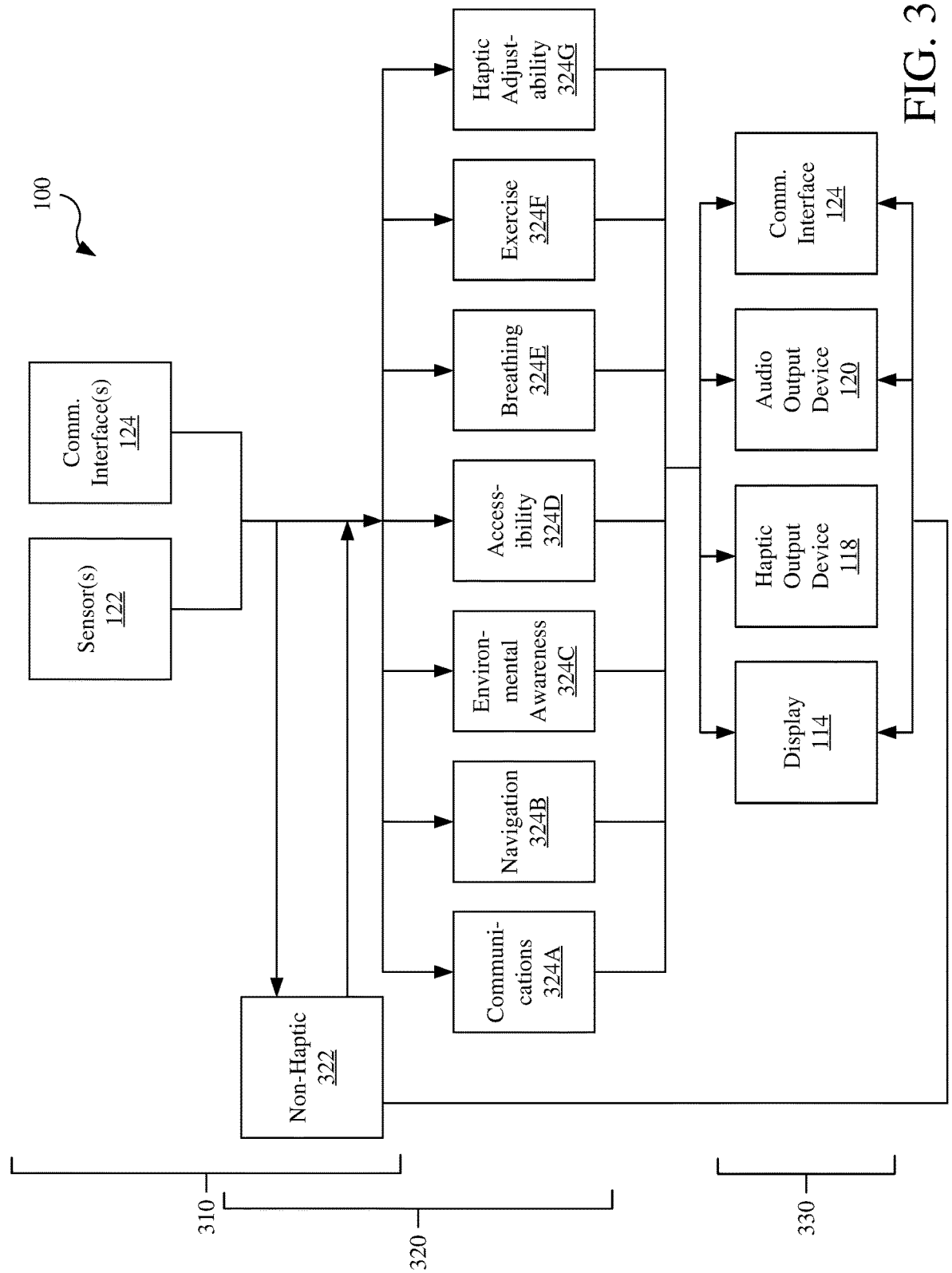
FIG. 3 is a functional diagram of the head-mounted display.
Figure 4:
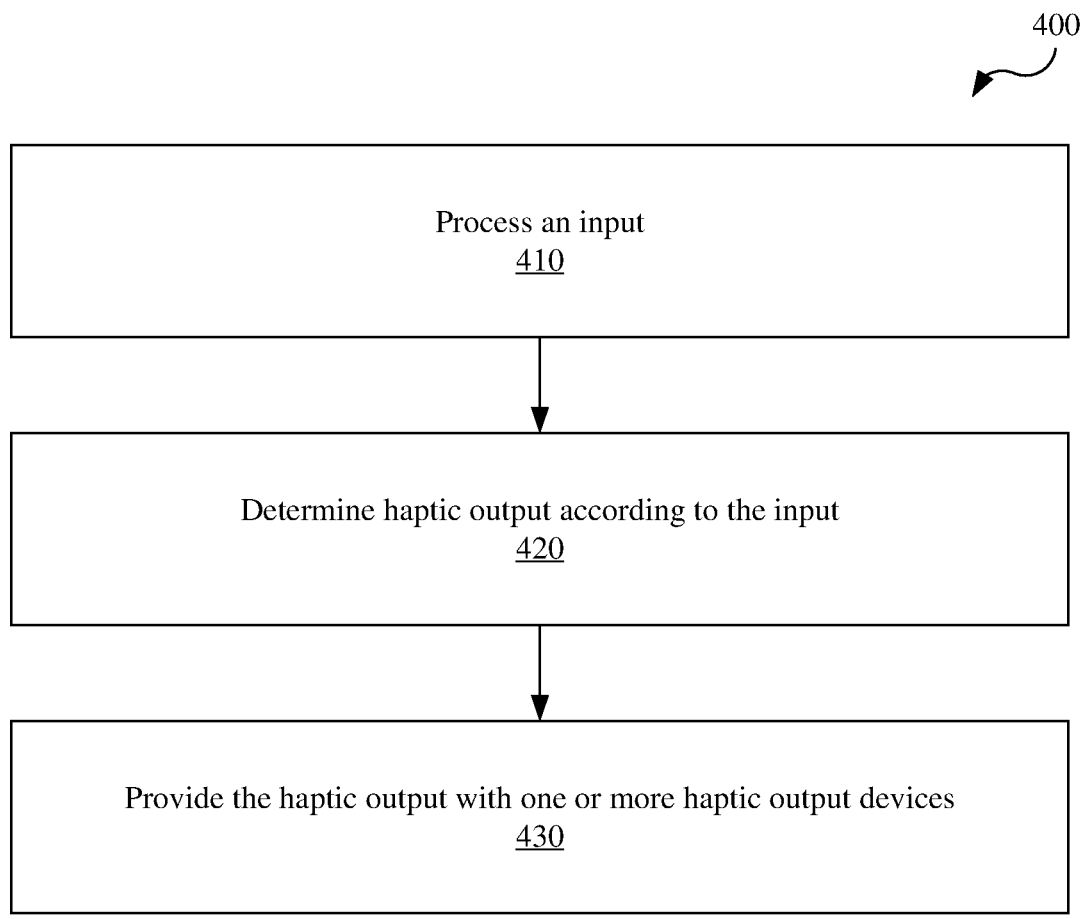
FIG. 4 is a flow diagram of a general method for providing haptic output.

Referring to FIGS. 3 and 4, the head-mounted display 100 may include one or more modules 320 according to which the haptic output and/or other output is provided. The modules 320 process one or more of the inputs 310 and provide one or more outputs 330 according to the inputs 310. The inputs 310, as discussed in further detail below, may include, but are not limited to, signals and/or other information received from and/or generated by the sensors 122, the communications interfaces 124, the module 320, or others of the modules 320. The modules 320 are, for example, software programs that include instructions that are executed by the controller 116 or other processing apparatus for processing the input 310 and providing the output 330. The outputs 330 are provided by the haptic output devices 118, the display 114, the audio output devices 120, and/or the communications interface 124. The inputs 310, the modules 320, and the outputs 330 are discussed in further detail below.

The modules 320 may include one or more non-haptic modules 322 that include instructions for providing graphical output, providing audio output, and/or performing other functions but not for providing the haptic output. The non-haptic modules 322 may, for example, include a movie module for providing graphical and/or audio content of a movie, a game module for providing graphical and/or audio content of a game or simulation, or a productivity module for providing graphical content and/or audio of a productivity program (e.g., word processor, spreadsheet, among others).

The modules 320 include one or more haptic modules 324 that include instructions for providing the haptic output according to the inputs and which may also include instructions for providing the graphical output, providing audio output, and/or performing other functions. Various combinations of the modules 320 may be executed concurrently, for example, one or more of the non-haptic modules 322 may be executed simultaneously with one or more of the haptic modules 324. As described in further detail below, the haptic modules 324 may include one or more of a communications module 324A, a navigation module 324B, an environmental awareness module 324C, an accessibility module 324D, a breathing module 324E, an exercise module 324F, or a haptic adjustability module 324G. Functions of each of the modules 320 may be included in another of the modules 320. Each of these haptic modules 324 and methods thereof are discussed in further detail below.

The one of more inputs 310 include signals and/or other information received or derived from the sensors 122, the communications interfaces 124, and/or others of the modules 320.

The sensors 122 function as the input 310, for example, by sending sensor signals that are received and processed by the controller 116 or other processing apparatus.

For example, the outward-facing cameras 122a, the depth sensor 122b, the ultrasonic sensors 122c function as the input 310 and are used for objection detection, identification, and/or locating. The outward-facing cameras 122a, the depth sensor 122b, and/or ultrasonic sensors 122c may send sensor signals (e.g., image data) that are subsequently processed by the controller 116 to perform such object detection, identification, and/or locating as part of the haptic module 324 or another module, or may include a separate processing apparatus and send signals with pre-processed information (e.g., detection, identification, and/or locating information).

In another example, the position sensor 122d functions as the input 310 and is used to detect the position (e.g., location and/or orientation) of the user. The position sensor 122d may send sensor signals that are subsequently processed by the controller 116 to determine the position of the user as part of the haptic module 324 or another module, or may include a separate processing apparatus and send signals with preprocessed information (e.g., the location, orientation, and/or movement of the user).

In another example, the audio sensor 122e functions as the input 310 and is used to detect a sound event in the environment. The sound event may, for example, be a generic sound event (e.g., a environmental noise above a certain volume threshold), a user-receiving sound event (e.g., a sound directed to the user, such as a person saying the user's name), or a user-initiated sound event (e.g., a voice command or other audio gesture provided by the user). The audio sensor 122e may send sensors signals (e.g., audio data) that are subsequently processed by the controller 116 or other processing apparatus to perform such audio event detection, or may include a separate processing apparatus and send signals with pre-processed information (e.g., indicating and/or providing details of the audio event, such as the voice command).

In another example, the one or more physiological sensors 122g function as the input 310 and are used to detect physiological conditions of the user (e.g., heart rate, eye movement, and/or galvanic skin response). The physiological sensors 122g send sensor signals that are subsequently processed by the controller 116 or other processing apparatus to determine such physiological condition as part of the haptic module 324 or another module, or may include a separate processing apparatus and send signals with preprocessed information (e.g., quantifying the physiological condition).

Instead or additionally, the communications interface 124 functions as the input 310. For example, the communications interface 124 may receive an external communication signal from a non-associated device 128b directly or indirectly via the user device 128a. The external communication signal may, for example, be associated an incoming video call, voice call, video message, voice message, written message, or type of communication. In another example, the communications interface 124 receives a user input signal from the user device 128a, such as a user command (e.g., to control a character or object of a game, make a menu selection). The communications interface 124 sends a corresponding communication signal that is then processed by controller 116 or other processing apparatus according to the haptic module 324, or may instead include a separate processing apparatus and send signals with pre-processed information (e.g., decrypting messages or implementing suitable communications protocols).

Instead or additionally, the haptic module 324 itself functions as the input 310. For example, the haptic module 324 may include instructions by which the haptic output is determined. For example, in a virtual reality environment (described below) of a gaming or simulator module, the haptic module 324 includes instructions by which the haptic output is provided that corresponds to graphical content. In another example, the breathing module 324E may provide breathing instructions at timed intervals.

Instead or additionally, another of the modules 320 functions as the input 310 to the haptic output module 324 according to which the haptic output of the output 330 is provided. In such case, the other module 320 functioning as the input 310 may be referred to as the primary output module, while the haptic output module 324 may be referred to as a secondary haptic output module. The primary output module may be configured for operation (e.g., interaction) with the secondary haptic output module, for example, by providing signals specifically for the secondary haptic module to provide haptic output. Alternatively, the primary output may be configured to operate irrespective of the secondary haptic module (e.g., by not providing specific signals and without other change) in which case the secondary haptic module processes the output of the primary output module (e.g., the information, graphical content, and/or audio output thereof) to determine and provide the haptic output. It should be noted that both the primary output module and the secondary haptic output module may provide the output 330 simultaneously, and also that multiple of the primary output modules may function as the one or more inputs 310 to the secondary haptic module at a given time (i.e., simultaneously) or at different times (i.e., asynchronously).

As a first, non-limiting illustrative example, the primary output module may be a navigation module that provides primary output of navigation instructions to the user (e.g., visually and/or aurally), while the secondary haptic output module is a secondary navigation module (e.g., that assesses navigation the navigation instructions from any of multiple primary navigation modules) and determines and causes the haptic output according to the primary output (e.g., providing a haptic output pattern having a right location, thereby tactilely providing navigation instructions to turn right).

In another non-limiting, illustrative example, the primary output module may be a gaming module, which may itself be one of the non-haptic modules 322 or the haptic modules 324, that provides graphical content that is interactive. The secondary haptic module may be an accessibility module that assesses the graphical content outside a field of view of the user with impaired vision and provides the haptic output pattern to draw the user's visual attention to the graphical content (e.g., a visual event in the periphery of the field of view).

As will be discussed in further detail below with respect to FIGS. 5-11 for specific ones of the haptic modules 324, the inputs 310 may include a communications signals, a directional input, navigation instructions, an environment feature of interest, a virtual output of interest, a health input, a breathing instruction, or an exercise instruction, which may be determined according to the various haptic output modules 324 (or other modules 320) alone or in accordance with various of the electronics of the head-mounted display 100 (e.g., the sensors 122 and/or the communications interfaces 124).

Based on the inputs 310, the haptic modules 324 cause outputs 330 that include providing the haptic output with the haptic output devices 118 and may also include providing graphical output with the display 114, audio output with the audio output devices 120, and/or communications output with the communications interface 124. As referenced above, different haptic output patterns may be provided from a single module and between different modules, such that a user may distinguish between the information or instructions of such different haptic output patterns. The different haptic output patterns may differ by characteristics of frequency, magnitude, location, directionality, and/or duration, as described above.

The non-haptic modules 322 cause outputs 330 that may include providing graphical output with the display 114, the audio output with the audio output devices 120, and/or communications output with the communications interface 124 but does not include providing the haptic output with the haptic output devices 118.

As will be discussed in further detail below with respect to FIGS. 5-11 for specific ones of the haptic modules 324, the haptic outputs 330 may include a communications, directional, navigation, environment awareness, virtual environment awareness, health, breathing, and/or exercise haptic output.

Referring to FIG. 4, a high-level method 400 for providing the haptic output may be executed by one or more of the haptic output modules 324. The method 400 generally includes processing 410 an input, determining 420 a haptic output according to the input, and outputting 430 the haptic output.

The processing 410 of the input is performed with the controller 116 or the processing apparatus in conjunction with, for example, the sensors 122, the communications interface 124, and/or one of the modules 320 (e.g., a primary graphic module). The input may include one or more of the inputs 310 described above (e.g., from the sensors 122, the communications interfaces 124, and/or from other modules 320). The processing 410 may include, but is not limited to: object detection, identification, and/or locating; position determination of the user or the head-mounted display 100 (e.g., location, orientation, and/or movement); physiological determination (e.g., of the heart rate, eye movement, galvanic skin response, or other physiological condition of the user); determining and/or assessing an audio event (e.g., identifying and/or assessing the type, source, and/or content of an audio event); communications processing (e.g., determining a type, source, and/or other characteristic of an incoming communication or user instruction); and/or content assessment (e.g., analyzing the information, images, and/or audio of output of another module).

The determining 420 of the haptic output is performed by the controller 116 or other processing apparatus according to the instructions of a module, such as one of the haptic modules 324, and the processing 410 of the input. The haptic output may be a haptic output pattern be determined, for example, with a lookup table or algorithm. The haptic output pattern may have characteristics described above (e.g., frequency, magnitude, location, directionality, and/or duration thereof), and may be further determined in accordance with other outputs (e.g., being an isolated haptic output, asynchronous combined output, or simultaneous combined output, as described above).

The outputting 430 of the haptic output is performed with the haptic output devices 118 as operated by the controller 116. The controller 116 sends haptic output signals to the haptic output devices 118 for the haptic output devices 118 to provide the determined haptic output.

Referring to FIGS. 5 to 11, each of the haptic modules 324 and methods implemented thereby are described in further detail below. As referenced above, the haptic modules 324 may include one or more of the communications module 324A, the navigation module 324B, the environmental awareness module 324C, the accessibility module 324D, the breathing module 324E, the exercise module 324F, or the haptic adjustability module 324G. Each is discussed in turn below.

Figure 5:
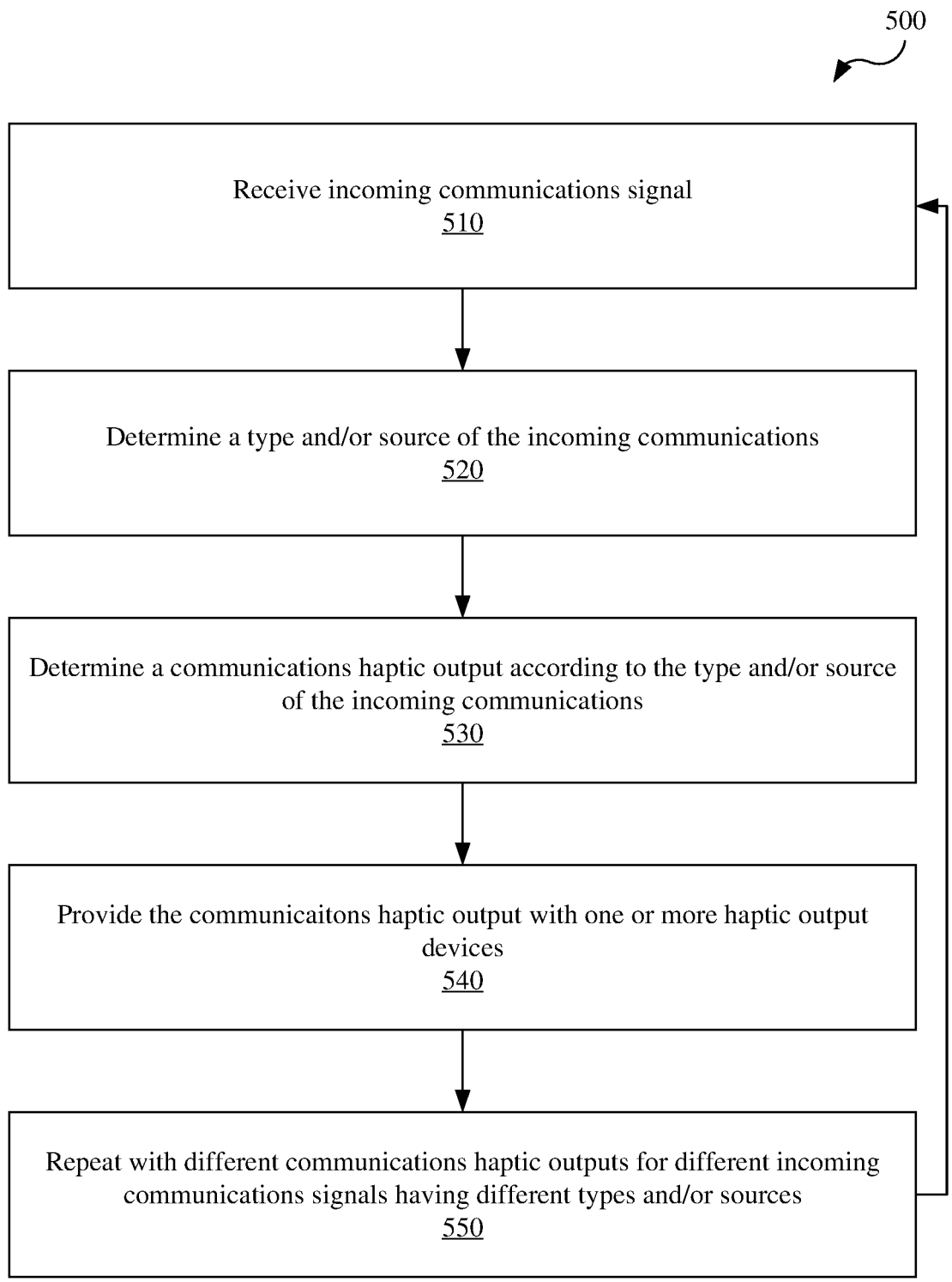
FIG. 5 is a flow diagram of a method for providing communication information using haptic output with the head-mounted display.

Referring to FIG. 5, according to the communications module 324A, the head-mounted display 100 provides the haptic output in response to incoming communications, for example, as part of communications programming or instructions that may be performed simultaneous with providing unrelated graphical content. The haptic output that corresponds to incoming communications is referred to herein as communications haptic output. The head-mounted display 100 receives one or more different communications signals from the non-associated device 128b with the communications interface 124 directly from the non-associated device 128b or intervening infrastructure (e.g., cellular tower) or indirectly from the user device 128a. The head-mounted display 100 then provides the communications haptic output in response to the communications signal. The communication module 324A may be a singular communication module that itself processes the communication signals, or the communications module 324A may be a secondary haptic output module (as described above) that receives input from (e.g., incoming communication information) and is otherwise compatible with one or more other communications modules that may be considered to be primary output modules (as described above).

For different types and/or sources of the communications signals, the communications haptic output corresponding thereto may have different haptic output patterns. The different types of communications signals include, but are not limited to, voice calls, video calls, and written messages (e.g., text messages or emails). The different sources of incoming communications refer to different categories of sources or different individuals, which may be a subset of sources selected by the user (e.g., favorite contacts or individual contacts). The different communications haptic outputs have different haptic output patterns that vary by one or more of frequency, magnitude, location, directionality, and/or duration, as described previously, to indicate the source and/or the type of the incoming communications signal.

The communications haptic output may be provided as an isolated haptic output, as described previously, in which case no graphical and/or audio output is provided in response to the communications signal. As a result and advantageously, the user may not be distracted visually and/or aurally by such graphical and/or audio indicator.

In one example, a first communications haptic output includes a first haptic output pattern to indicate an incoming call (e.g., voice or video), while a second communications haptic output includes a second haptic output pattern to indicate an incoming message. The first output pattern and the second output pattern differ by at least one of frequency, magnitude, location, directionality, and/or duration, so as to indicate the different type of incoming communication. For example, the first haptic output pattern and the second haptic output pattern differ only by frequency, wherein the first haptic output pattern turns on and off in repeated one second intervals, whereas the second haptic output pattern turns on and off for long and short intervals (e.g., two seconds and one-half second, respectively). Thus, a user experiencing the first communications haptic output and the second communications haptic output will be able to differentiate the incoming communication as being an incoming call or an incoming written message, respectively. Instead or additionally, the different haptic output patterns may indicate the different sources of the communications signal.

As shown in FIG. 5, a method 500 provides communications haptic output with a head-mounted display to indicate incoming communications. The method 500 may be provided according to instructions of the communications module 324A. The method 500 generally includes receiving 510 an incoming communication signal, determining 520 a type and/or source of the first incoming communication signal, determining 530 a communications haptic output according to the type and/or source, providing 540 output that includes the communications haptic output, and repeating 550 steps 510, 520, 530, 540 for one or more different incoming communication of different type and/or source with one or more corresponding different communications haptic outputs. The receiving 510 and the determining 520 may be considered the processing 410 of the inputs 310 described previously with respect to FIGS. 3 and 4. The method 500 may be performed while providing other output with another module 320, which is unrelated to the output of the communications module 324A.

The receiving 510 of the incoming communications signal is performed with the communications interface 124 of the head-mounted display 100. The communications signal may be received directly from a non-associated device 128b (e.g., therefrom or from intervening infrastructure) or indirectly with the user device 128a. Any suitable communications protocol (e.g., wireless protocol) may be used.

The determining 520 of the type and/or source of the communication signal is performed with the controller 116 or another processing apparatus (e.g., of the communications interface 124). For example, the communication signal may include information or otherwise indicate the type and/or source thereof, which may be evaluated by the controller 116 (e.g., according to software programming and/or a look-up table).

The determining 530 of the communications haptic output is performed with the controller 116 or another processing apparatus. For example, the communications haptic output is determined to have a haptic output pattern according to the source, type, and/or other characteristic of the incoming communications signal according to software programming and/or a look-up table.

The providing 540 of the output includes providing the communications haptic output and is performed with the one or more haptic output devices 118 as operated by the controller 116. The communications haptic output may be provided simultaneous with unrelated graphical content provided according to another of the modules 320 (e.g., in each of watching a movie, playing a game, and using a productivity program). The providing 540 may or may not also include providing other output, for example, graphical output with the display 114 (e.g., graphical output indicating the type and/or source of the incoming communication) and/or aural output with the audio output device 120 (e.g., a tone or spoken words) that indicates the presence, type, and/or source of the incoming communication.

The repeating 550 of the steps 510, 520, 530, 540 is performed as described above. For different incoming communications signals of different types and/or sources, different communications haptic outputs with different haptic output patterns are determined and provided. While two different types of incoming communications signals with two different haptic output patterns were discussed above, greater numbers of types, sources, or combinations thereof and the corresponding communications haptic outputs may be provided (e.g., three, four, or more) with different haptic output patterns.

Figure 6:
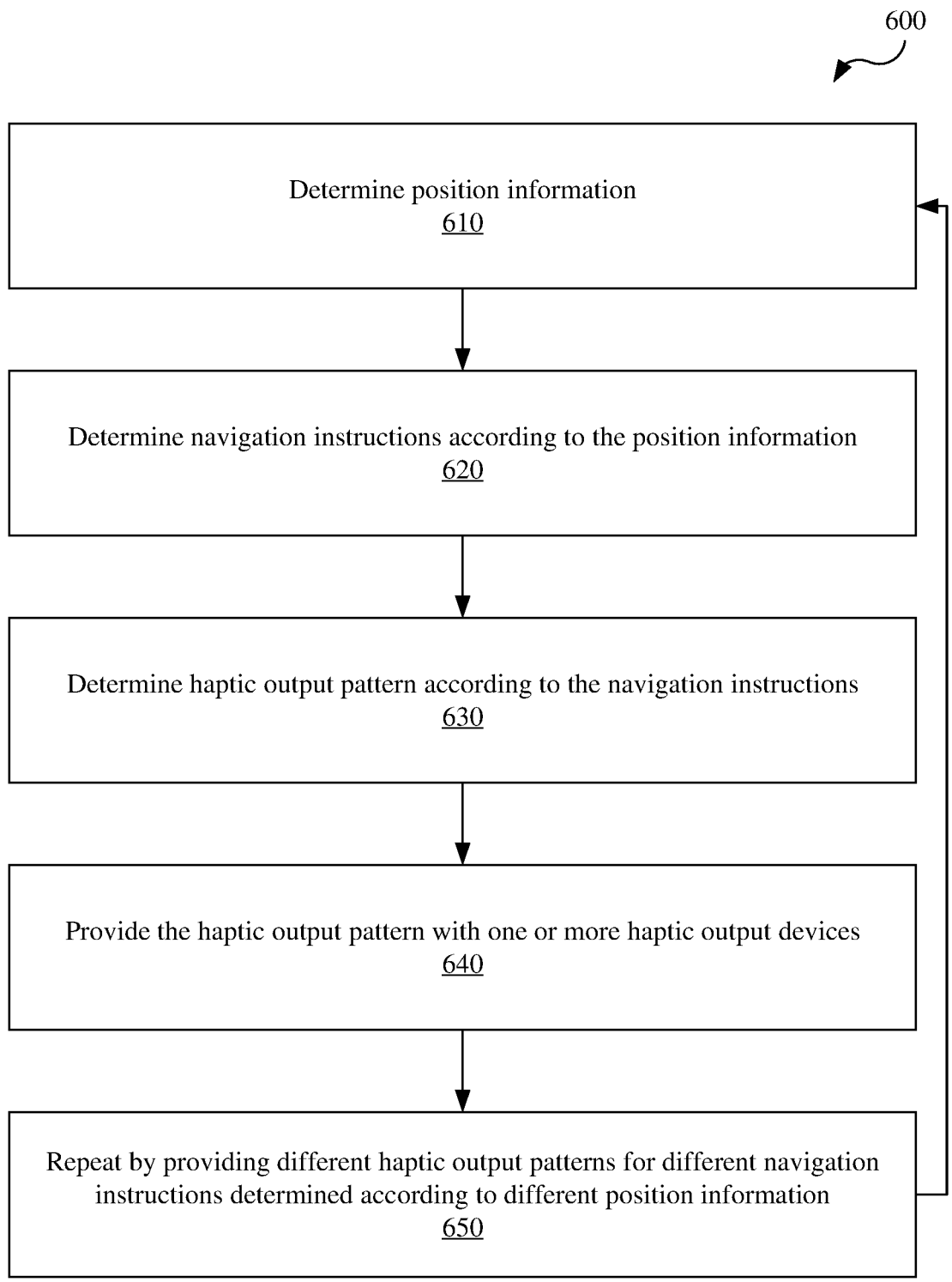
FIG. 6 is a flow diagram of a method for providing navigation instructions using haptic output of the head-mounted display.
Figure 7:
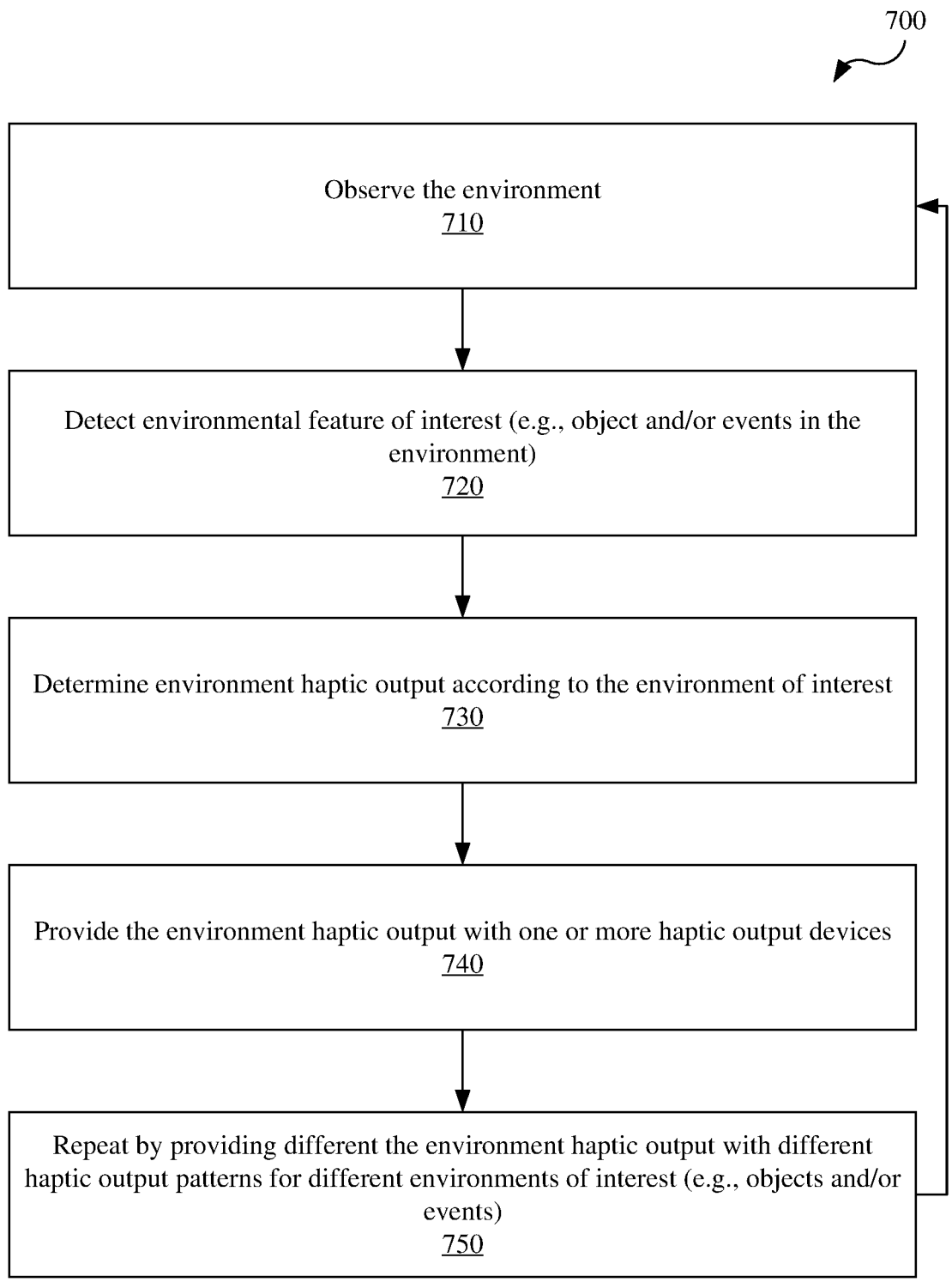
FIG. 7 is a flow diagram of a method for providing environmental awareness using haptic output of the head-mounted display.
Figure 8:
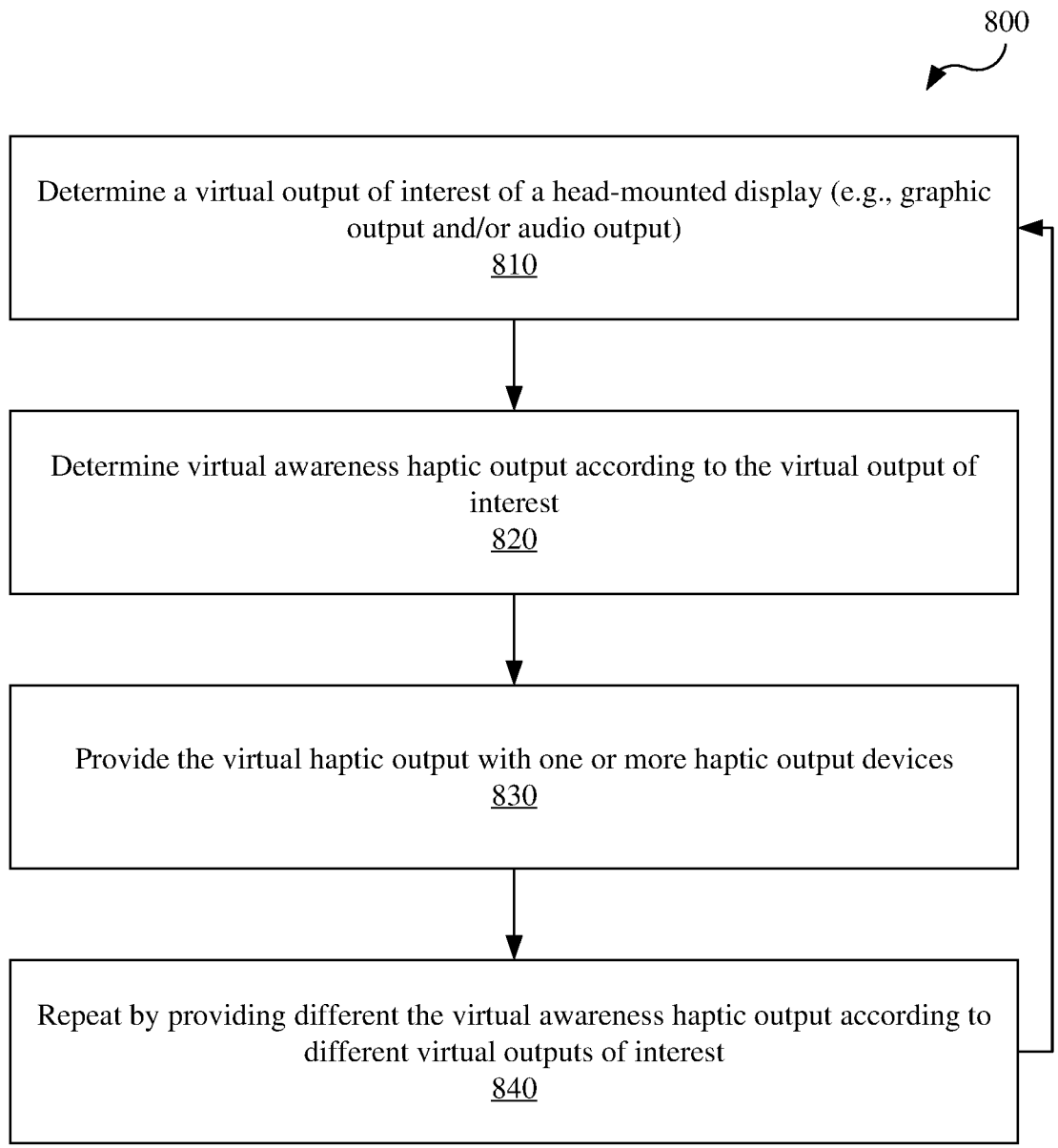
FIG. 8 is a flow diagram of a method for providing accessibility functions using haptic output of the head-mounted display.

Referring to FIGS. 6-8, the head-mounted display 100 process the inputs 310 that are directional inputs, and provides the outputs 330 that are directional outputs, including directional haptic outputs. The directional inputs are inputs having a directional characteristic associated therewith, such as a navigation instruction (e.g., to turn in a certain direction), a location of an object or event in a real environment (e.g., the direction thereof relative to the user or current view of the user), or a location of a virtual output of interest (e.g., the direction thereof relative to the user or current view of the user). The directional inputs may be considered to include or be derived from various ones of the sensors 122 (e.g., the environmental sensors 122a-122e) or other input source. The directional outputs are outputs that indicate a direction to a user (e.g., having a directional characteristic associated therewith), such as a navigation instruction or a directional cue to draw the attention of the user in a different direction. The directional inputs 310 and the directional outputs 330 are discussed below with respect to FIG. 6 and the navigation module 324B, of the environmental object or event with respect to FIG. 7 and the environmental awareness module 324C, and of the virtual output of interest with respect to FIG. 8 and the accessibility module 324D.

Referring to FIG. 6, according to the navigation module 324B, the head-mounted display 100 provides the haptic output to provide navigation instructions, for example, as part of navigation programming or instructions. The haptic output corresponding to the navigation instructions is referred to herein as the navigation haptic output. The head-mounted display 100 determines position information (e.g., location and/or orientation information) and provides the navigation haptic output to instruct the user of an upcoming maneuver (e.g., turn or stop) and/or may further provide the navigation haptic output to notify the user of proximity to such upcoming maneuver. For example, the navigation haptic output may be provided by the right haptic device 118R to notify the user of an upcoming right turn, or by the front haptic device 118F to notify the user of an upcoming stop. The haptic output pattern of the navigation haptic output may change as the user approaches the maneuver to notify the user of proximity thereto. For example, the haptic output pattern may increase in magnitude and/or frequency (e.g., increasing proportion of time on) as the user approaches the turn or stop. The navigation module 324B may be a singular navigation module that itself determines the navigation information, or the navigation module 324B may be a secondary haptic output module (as described above) that receives input from a primary output module (e.g., navigation instructions) and is otherwise compatible with one or more other navigation modules that may be considered to be primary output modules. As referenced above, the navigation instructions or underlying sensor information (e.g., of the position sensor 122d) may be considered the directional inputs, while the navigation haptic output may be considered the directional haptic output.

As shown in FIG. 6, a method 600 provides navigation haptic output with a head-mounted display to provide navigation instructions. The method 600 may be provided according to instructions of the navigation module 324B. The method 600 generally includes determining 610 position information, determining 620 navigation instructions and/or information according to the position information for reaching a destination, determining 630 output that includes navigation haptic output according to the navigation instructions and/or information, providing 640 the output that includes the navigation haptic output, and repeating 650 steps 610, 620, 630, 640, for example, until the destination is reached. The determining 610 and the determining 620 may be considered the processing 410 of the inputs 310 described previously with respect to FIGS. 3 and 4. The method 600 may be performed while providing other output with another module 320, which is unrelated to the output of the navigation module 324B.

The determining 610 of the position information is performed with the controller 116 or other processing apparatus in conjunction with the sensors 122 (e.g., the position sensors 122d and/or the outward facing-cameras 122a, depth sensor 122b, and/or ultrasonic sensor 122c). For example, the sensors 122 send sensor signals that include position information or other information (e.g., images), which is then processed by the controller 116 to determine the position information. The position information may include the location, heading, and/or orientation of the user, which may be derived directly from the position sensors 122d or indirectly (e.g., using object recognition) with the outward-facing cameras 122a, depth sensor 122b, and/or ultrasonic sensor 122c.

The determining 620 of the navigation instructions and/or information is performed by the controller 116 or other processing apparatus according to the position information. For example, the navigation instructions may be determined using a suitable mapping information and/or navigation algorithms. The navigation instructions and/or information includes directional instructions for the user (e.g., to turn or stop and/or a distance to such a turn or stop). For example, the position information (e.g., location, orientation, and movement) may be compared to a database (e.g., a map) to determine the navigation instructions and/or to objects observed in the environment (e.g., the position of a doorway). The position information and/or the navigation instructions may be considered the directional input.

The determining 630 of the output that includes the navigation haptic output is performed by the controller 116 or other processing apparatus according to the navigation instructions. For example, the location and/or directionality of the haptic output pattern of the navigation haptic output may be determined according to the direction of the navigation instructions (e.g., the front, right, or left haptic output devices 118 corresponding to navigation instructions to stop, turn right, or turn left, respectively, or the haptic output devices 118 may act directionally on the user by pushing backward, rightward, or leftward corresponding to navigation instructions to stop, turn right, or turn left respectively). The frequency and/or strength of the haptic output pattern of the navigation haptic output may be determined according to the proximity of the user to the maneuver and/or the speed of the user. For example, the strength may increase and/or the on/off frequency may increase (e.g., being on more) as the user approaches the maneuver. The determining 630 may also include determining other types of output, such as graphical and/or aural navigation instructions.

The providing 640 of the output that includes the navigation haptic output is performed by the haptic output devices 118 as controlled by the controller 116 or other processing apparatus. The other output may be provided by the display 114 and/or the audio output devices 120. The other output may be provided simultaneous with the providing 640 of the navigation haptic output. The navigation haptic output may be considered the directional haptic output.

The repeating 650 of the steps 610, 620, 630, 640 is performed, for example, until the user reaches the destination.

Referring to FIG. 7, according to the environmental awareness module 324C, the head-mounted display 100 provides the haptic output to inform the user of objects and/or events (e.g., occurrence and/or location thereof) in the environment of the head-mounted display 100. The objects and/or events in the environment may be referred to as the environmental feature of interest. The haptic output corresponding to the environmental feature of interest is referred to hereafter as the environment haptic output. The head-mounted display 100 may detect an object in the environment and provide the environment haptic output to inform the user of the presence and/or location of the object. For example, the object may be an obstacle in the environment, such as a tripping hazard or barrier (e.g., wall). Instead or additionally, the head-mounted display 100 may detect an event in the environment and provide the environment haptic output to inform the user of the occurrence, type, and/or location of the event. For example, the event may be a visual event (e.g., rapid movement or other visual change, such as lighting, relative to the environment) and/or an aural event (e.g., relatively loud noise relative to the environment). For example, a car accident might be both a visual event (e.g., a rapid slowing of vehicles) and an aural event (e.g., the impact making a loud noise). As referenced above, the environmental feature of interest be considered the directional inputs or the underlying sensor information (e.g., from the sensors 122a-122c), while the environment haptic output may be considered the directional haptic output that, for example, indicates a direction of the environmental feature of interest relative to the user.

The haptic output pattern of the environment haptic output may indicate the location and/or proximity of the object relative to the user. The haptic output pattern may indicate the location of the object (e.g., using the haptic output devices 118 in different locations) and/or proximity thereto (e.g., varying frequency and/or magnitude of the haptic output). Other output may be provided in conjunction with the environment haptic output to indicate the object or event, for example, by providing graphical content and/or aural indicating the presence and/or location of the object or event (e.g., provided in the periphery of the display 114 and/or by one of the audio output devices 120 on a given side of the user).

Providing the environment haptic output to indicate the environmental feature of interest may advantageously provide the user with greater awareness of the environment, including those objects and/or events that might be outside the user's field of view with the display 114 (e.g., behind the user), outside range of hearing, and/or otherwise less noticeable by the user with or without the display 114 (e.g., in darkness, for a transparent object, and/or to supplement sensing for vision or hearing impairments).

As shown in FIG. 7, a method 700 provides environment haptic output with a head-mounted display. The method 700 may be provided according to instructions of the environmental awareness module 324C. The method 700 generally includes observing 710 the environment, detecting 720 the environmental feature of interest (i.e., objects and/or events in the environment), determining 730 output that includes the environment haptic output according to the detection, providing 740 the output that includes the environment haptic output, and repeating 750 steps 710, 720, 730, 740. The observing 710 and the detecting 720 may be considered the processing 410 of the inputs 310 described previously with respect to FIGS. 3 and 4. The method 700 may be performed while providing other output with another module 320, which may be unrelated to the output of the environmental awareness module 324C.

The observing 710 of the environment is performed with the one or more sensors 122, which may include the outward-facing cameras 122a, the depth sensor 122b, the ultrasonic sensor 122c, and/or the audio sensors 122e. The observing 710 may instead or additionally be performed with the position sensors 122d by comparing the location, orientation, and/or movement of the user to known objects (e.g., to a map).

The detecting 720 of the environmental feature of interests (e.g., an object and/or the events of the environment) is performed by the controller 116 or other processing apparatus according to the observing. For example, the sensors 122 send sensor signals that include information about the environmental feature of interest (e.g., of the object and/or event, such as presence or occurrence, identity, location, and/or movement) or signals that include other information (e.g., images) that are processed by the controller 116 or other processing apparatus to determine the information about environmental feature of interest. The environmental feature of interest (e.g., the objects and/or events of the environment) or the underlying sensor information (e.g., of the sensors 122a-122c) may be considered the directional input.

The determining 730 of the output that includes the environment haptic output is performed by the controller 116 or other processing apparatus according to the detecting 720 of the environmental feature of interest (e.g., the object and/or event information). For example, the location and/or directionality of the haptic output pattern of the environment haptic output may be determined according to the location of the environmental feature of interest, such as the haptic output pattern including the front, right, left, or rear haptic output devices 118 corresponding to the object and/or the event being in front, left, right, or rear of the user. The frequency and/or strength of the haptic output pattern may be determined according to the proximity of the user to the maneuver and/or the speed of the user, such as the strength and/or frequency increasing as the user approaches the object and/or event. The environment haptic output may also vary according to the type or other characterization of the object and/or the event, such as to indicate distinguish an emergency from other types of events. The determining 730 may also include determining other types of output, such as graphical and/or aural output that indicates the location and/or the type or characterization of the environmental feature of interest.

The providing 740 of the output that includes the environment haptic output is performed by the haptic output devices 118 as controlled by the controller 116 or other processing apparatus. The other output may be provided by the display 114 and/or the audio output devices 120. The other output may be provided simultaneous with the providing 740 of the haptic output pattern. The environment haptic output may be considered the directional haptic output.

The repeating 750 of the steps 710, 720, 730, 740 is repeated over time (e.g., the method 700 may be performed continuously.

Referring to FIG. 8, according to the accessibility module 324D, the head-mounted display 100 provides the haptic output to better adapt functionality of the head-mounted display 100 to users with impairments, such as vision and/or hearing. The accessibility module 324D may be a singular module that itself provides other functions (e.g., movies, navigation, productivity, communication, among others) in which case the accessibility module 324D may include instructions that directly provide the haptic output (e.g., corresponding to other outputs). Alternatively, the accessibility module 324D may be a secondary haptic output module (as described above) that receives input from and is otherwise compatible with one or more other modules that may be considered the primary output module. For example, the accessibility module 324D may receive and process video and/or audio signals from another module 320 for determining the haptic output. In either case, the accessibility module 324D may be user selectable (e.g., may be turned off by users that do not have corresponding impairments) and/or configurable (e.g., the haptic output being provided according to the type of impairment, such as location of vision and/or hearing loss).

The accessibility module 324D may be configured to draw the user's attention to graphical and/or aural outputs that might otherwise be less likely to be noticed by the user due to their impairment. Such graphical and/or audio outputs may be referred to cooperatively as virtual outputs of interest. The haptic output corresponding to the virtual outputs of interest is referred to hereafter as virtual awareness haptic output.

For example, for a user with a vision impairment that limits their effective field of view (e.g., blindness in one eye or a peripheral vision impairment), the graphics of interests (e.g., objects and/or events) may be output by the display 114 in regions that are less noticeable by the user (e.g., on the side of the eye having blindness or in the periphery of the field of view). The virtual awareness haptic output is provided to draw the user's attention toward the graphics of interest, such as by having the haptic output pattern with the right haptic device 118R to indicate the object and/or event of interest to the right. In another example, for a user with a hearing impairment, sounds of interest may be output by the audio output devices 120, such as to indicate the location of a sound-emitting character or device in a virtual reality environment of a gaming or simulation module (e.g., a car approaching from a right side). The virtual awareness haptic output is provided to draw the user's attention toward the source of the sound of interest, such as by providing haptic output with the right haptic output device 118R to indicate the sound of interest to the right. The virtual objects of interest (e.g., the graphics of interests and/or the sounds of interest) may be considered the directional input, while the virtual awareness haptic output may be considered the directional output.

In addition to indicating the location of the object, event, or sound of interest, the virtual awareness haptic output may also indicate the type or other characteristic thereof. For example, for those objects, events, or sound of greater interest or of closer proximity, the frequency and/or magnitude of the haptic output pattern may be greater than for those of lesser interest or further proximity.

As shown in FIG. 8, a method 800 provides virtual awareness haptic output with a head-mounted display. The method 800 may be provided according to instructions of the accessibility module 324D. The method 800 generally includes determining 810 a virtual output of interest, determining 820 output that includes virtual awareness haptic output according to the output of interest, providing 830 the output including the virtual awareness haptic output, and repeating 840 the steps 810, 820, 830, 840. The determining 810 and the determining 820 may be considered the processing 410 of the inputs 310 described previously with respect to FIGS. 3 and 4.

The determining 810 of the virtual output of interest is performed with the controller 116 or other processing apparatus, for example, according to instructions of the accessibility module 324D. In the case of the accessibility module 324D being a secondary haptic output module to a primary output module, the accessibility module 324D receives and processes the output (graphical and/or aural) of the primary output module. For example, graphical output may be processed according to suitable image recognition algorithms for determining the output of interest (e.g., detecting, identifying, and/or locating). In another example, the audio output may be processed according to suitable audio recognition algorithms for determining the output of interest (e.g., detecting, identifying, and/or locating). The virtual output of interest may be considered the directional input.

The determining 820 of the output that includes the virtual awareness haptic output is performed with the controller 116 or other processing apparatus, for example, with a lookup table according to the virtual output of interest. The haptic output pattern of the virtual awareness haptic output may be determined to have a location and/or directionality that indicates the direction in which the virtual output of interest is located. The haptic output pattern of the virtual awareness haptic output may be determined to have a frequency and/or magnitude that indicates the type, proximity, and/or importance of the output of interest (e.g., increasing for greater importance).

The determining 820 may also include determining other output, such as graphical and/or aural output that may further indicate, the direction, proximity, type, and/or importance of the output of interest. For example, a graphic may be provided at a periphery of the user's effective field of view to indicate the output of interest as occurring in the direction of that periphery.

In those cases in which the accessibility module 324D includes direct instructions that may correspond to the outputs of interest, the determining 810 of the output of interest and the determining 820 may be omitted.

The providing 830 of the output that includes the virtual awareness haptic output pattern is performed by the haptic output devices 118 as controlled by the controller 116 or other processing apparatus. The other output may be provided by the display 114 and/or the audio output devices 120. The other output may be provided simultaneous with the providing 830 of the haptic output pattern. The virtual awareness haptic output may be considered the directional output.

The repeating 840 of the steps 810, 820, 830 is repeated over time (e.g., the method 800 may be performed continuously.

Furthermore, the method 800 may be preceded by determining whether and/or configuring how the accessibility functions are provided. For example, the head-mounted display 100 may receive an input from the user or other source indicating whether and what type of impairment the user may have (e.g., vision, hearing, and/or location). Alternatively, the head-mounted display 100 may assess the impairment of the user.

Figure 9:
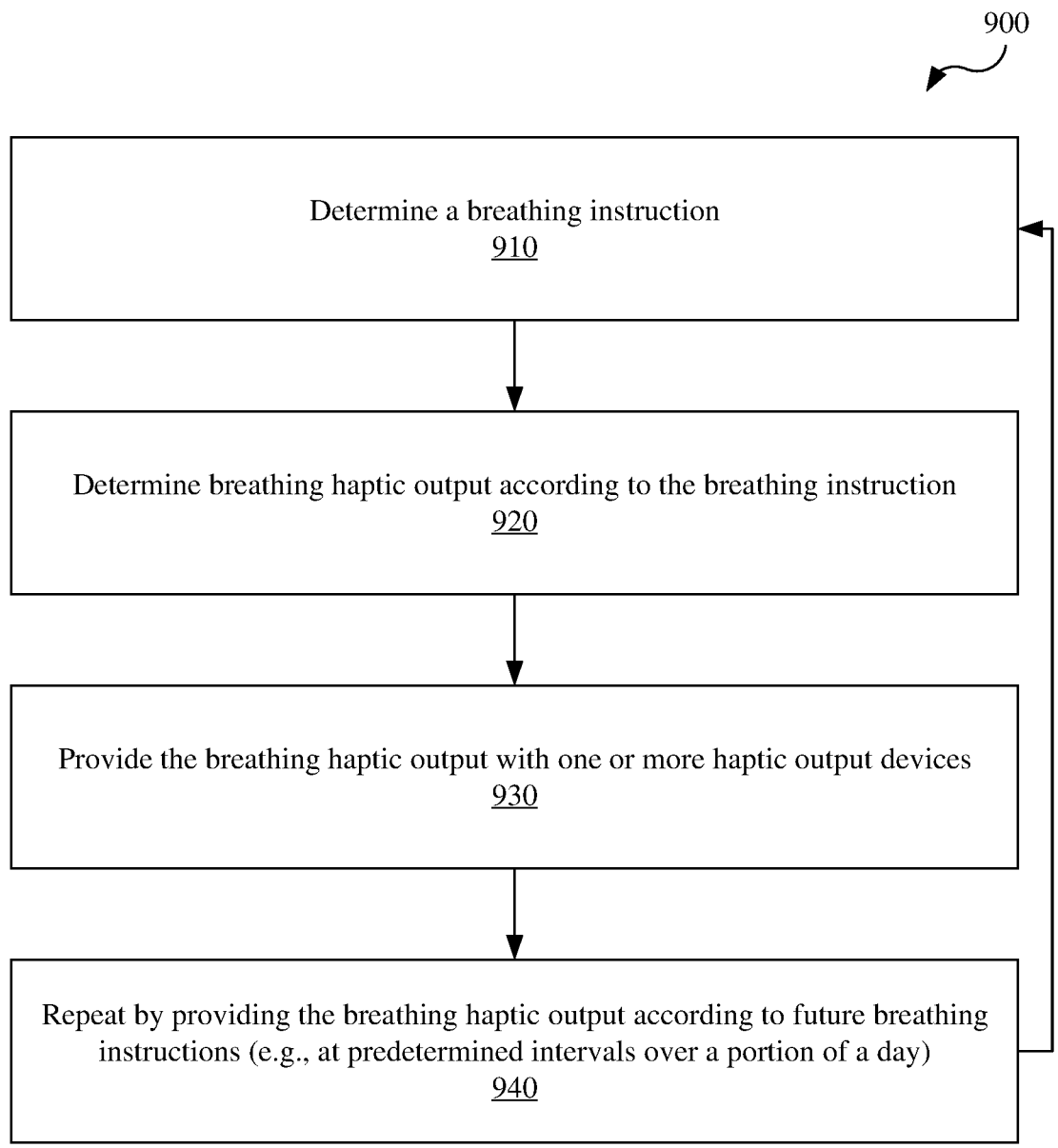
FIG. 9 is a flow diagram of a method for providing breathing instructions using haptic output of the head-mounted display.
Figure 10:
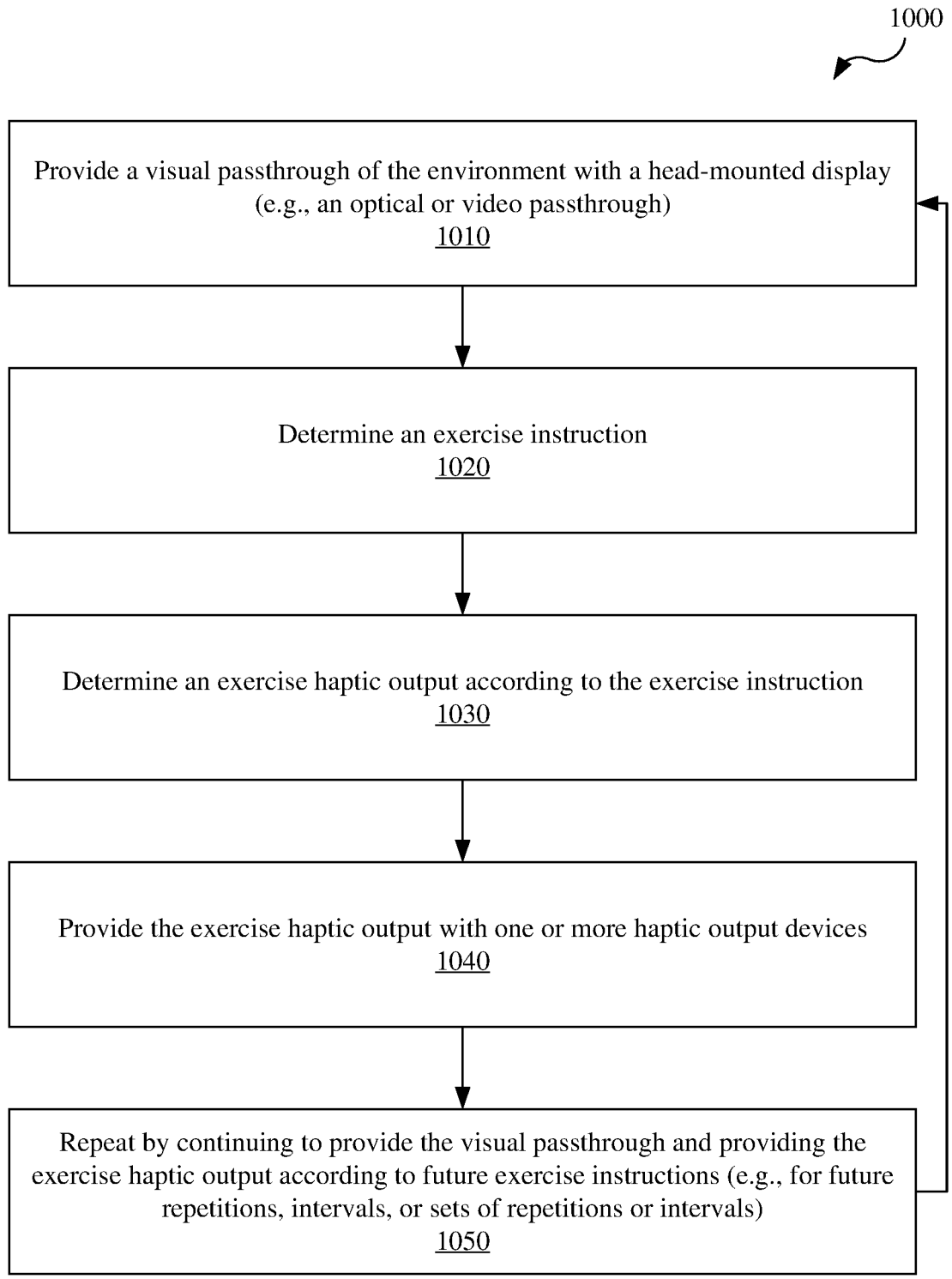
FIG. 10 is a flow diagram of a method for providing exercise instructions using haptic output of the head-mounted display.

Referring to FIGS. 9-10, the head-mounted display 100 process the inputs 310 that are health inputs, and provides the outputs 330 that are health haptic outputs. The health inputs are inputs having a personal health aspect associated therewith, such as a breathing instruction or an exercise instruction or the underlying sensor information (e.g., from the sensors 122a-122g). The health haptic outputs are outputs having a personal health aspect associated therewith, such as the physical output for a breathing instruction or the exercise instruction. The inputs 310 and the outputs 330 of the breathing instructions are discussed below with respect to FIG. 9 and the breathing module 324E, and of the exercise instructions with respect to FIG. 10 and the exercise module 324F.

Referring to FIG. 9, according to the breathing module 324E, the head-mounted display 100 provides the haptic output to instruct a user to take a breath, such as for relaxation purposes, which is referred to hereafter as the breathing haptic output. The breathing instruction may be provided at a predetermined time interval (e.g., every hour) and/or in response to user behavior or physiological conditions (e.g., if little activity is detected based on movement and/or heart rate as measured by the sensors 122). The breathing instruction may be output only as the breathing haptic output and not a graphical and/or audio output, so as to not distract the user with graphical and/or aural content, or may be provided as a combination of the breathing haptic output, along with graphical and/or aural output. The breathing instruction or the underlying sensor information (e.g., pertaining to the user activity) may be considered the health input, while the breathing haptic output may be considered the health haptic output.

As shown in FIG. 9, a method 900 provides breathing haptic output with a head-mounted display to provide breathing instructions. The method 900 may be provided according to instructions of the breathing module 324E. The method 900 generally includes determining 910 a breathing instruction, determining 920 output that includes the breathing haptic output, providing 930 the output that provides the breathing instruction, and repeating 940 the steps 910, 920, 930 over time.

The determining 910 of the breathing instruction is performed with the controller 116 or other processing apparatus in conjunction with a timer and/or the sensors 122. As referenced above, the breathing instruction may be determined according to a regular interval, activity of the user, or a combination thereof (e.g., interval following inactivity of the user). The activity of the user may be determined, for example, with the position sensor 122d (e.g., sensing movement of the user) and/or the physiological sensor 122g (e.g. measuring the heart rate of the user). The breathing instruction may be considered the health input.

The determining 920 of the breathing haptic output is performed with the controller 116 or other processing apparatus according to the breathing instruction. For example, the breathing haptic output is determined to function as a physical cue or instruction for the user to take a breath. The breathing haptic output may include a single pre-defined haptic output pattern (i.e., only one haptic output pattern is used to provide the breathing instruction), or more than one pre-defined haptic output patterns or variable haptic output patterns. The output may or may not include graphical output and/or aural output that also provide visual and/or aural instructions for the user to take a breath.

The providing 930 of the breathing haptic output is performed with the haptic output device 118 as operated by the controller 116 or other processing apparatus. Other breathing output may also be performed with the display 114 and/or the audio output device 120. The breathing haptic output may be considered the health haptic output.

The repeating 940 of the steps 910, 920, 930 is repeated over time (e.g., the method 900 may be performed continuously or over a predetermined period of time (e.g., waking hours).

Referring to FIG. 10, according to the exercise module 324F, the head-mounted display 100 provides the haptic output to instruct a user to perform an exercise, such as a lifting repetition, series of repetitions, or a timed interval exercise (e.g. a sprint). The haptic output corresponding to the exercise instruction is referred to hereafter as an exercise haptic output. The exercise instruction may be provided according to a time interval and/or activity of the user (e.g., determined according to the sensors, which may include the outward-facing camera 122a, the position sensor 122d, and/or the physiological sensor 122g). For example, the head-mounted display may determine when the user has completed the exercise, and provide the exercise haptic output as the exercise instruction to begin a new repetition after a prescribed break time following completion of the previous repetition or interval and/or to end a repetition or interval after a prescribed interval time. The exercise instructions may be provided only haptically, such that other graphic and/or aural content may be provided to the user and be uninterrupted visually and/or aurally when providing the exercise instructions. For example, the graphical content may be an optical or video pass through by which the user views the environment. The exercise module 324F may provide the primary or only graphical output of the display 114 when operated. The exercise instruction or the underlying sensor information (e.g., pertaining to performance by the user of the exercise or a previous exercise) may be considered the health input, while the breathing haptic output may be considered the health haptic output.

As shown in FIG. 10, a method 1000 provides exercise haptic output with a head-mounted display to provide the user exercise instructions. The method 1000 may be provided according to instructions of the exercise module 324F. The method 1000 generally includes providing 1010 a visual passthrough of an environment, determining 1020 an exercise instruction, determining 1030 output that includes the haptic output to provide the exercise instructions, providing 1040 the output that includes the exercise haptic output to provide the exercise instructions, and repeating steps 1010, 1020, 1030, 1040 over time.

The providing 1010 of the visual passthrough of the environment may be performed passively as an optical passthrough or actively as a video passthrough. In the case of the optical passthrough, the user is able to view the environment directly, such as through a transparent lens. In the case of a video passthrough, the environment is observed with the outward-facing cameras 122a and video images captured thereby are output by the display 114.

The determining 1020 of the exercise instruction is performed with the controller 116 or other processing apparatus in conjunction with a timer and/or the sensors 122. As referenced above, the exercise instruction is to perform an exercise (e.g., a repetition, series of repetition, or timed exercise interval). Timing of the exercise instruction may be determined according to a regular interval, or an interval from completion of the last exercise (e.g., determined by visually monitor, measuring movement, and/or measuring physiological condition of the user with the sensors 122). The exercise instruction may include a type, duration, number of repetitions, or other instructional information. The exercise instruction may be considered the health input.

The determining 1030 of the output that include the exercise haptic output is performed with the controller 116 or other processing apparatus. The haptic output pattern of the exercise haptic output may be determined according to the type, duration, or number of repetitions of an exercise. For example, the haptic output pattern may differ by frequency, magnitude, location, direction, and/or duration according to exercise type (e.g., pushups or situps), duration (e.g., long sprint vs. short sprint), or number (e.g., on/off pulsing to indicate one vs. more than one repetition).

The providing 1040 of the exercise haptic output is performed with the haptic output device 118 as operated by the controller 116 or other processing apparatus. Other exercise instructional output may also be performed with the display 114 and/or the audio output device 120. The exercise haptic output may be considered the health haptic output.

The repeating 1050 of the steps 1010, 1020, 1030, 1040 is repeated, for example, over a set of repetitions or over a workout that includes a series of different sets of repetitions.

Figure 11:
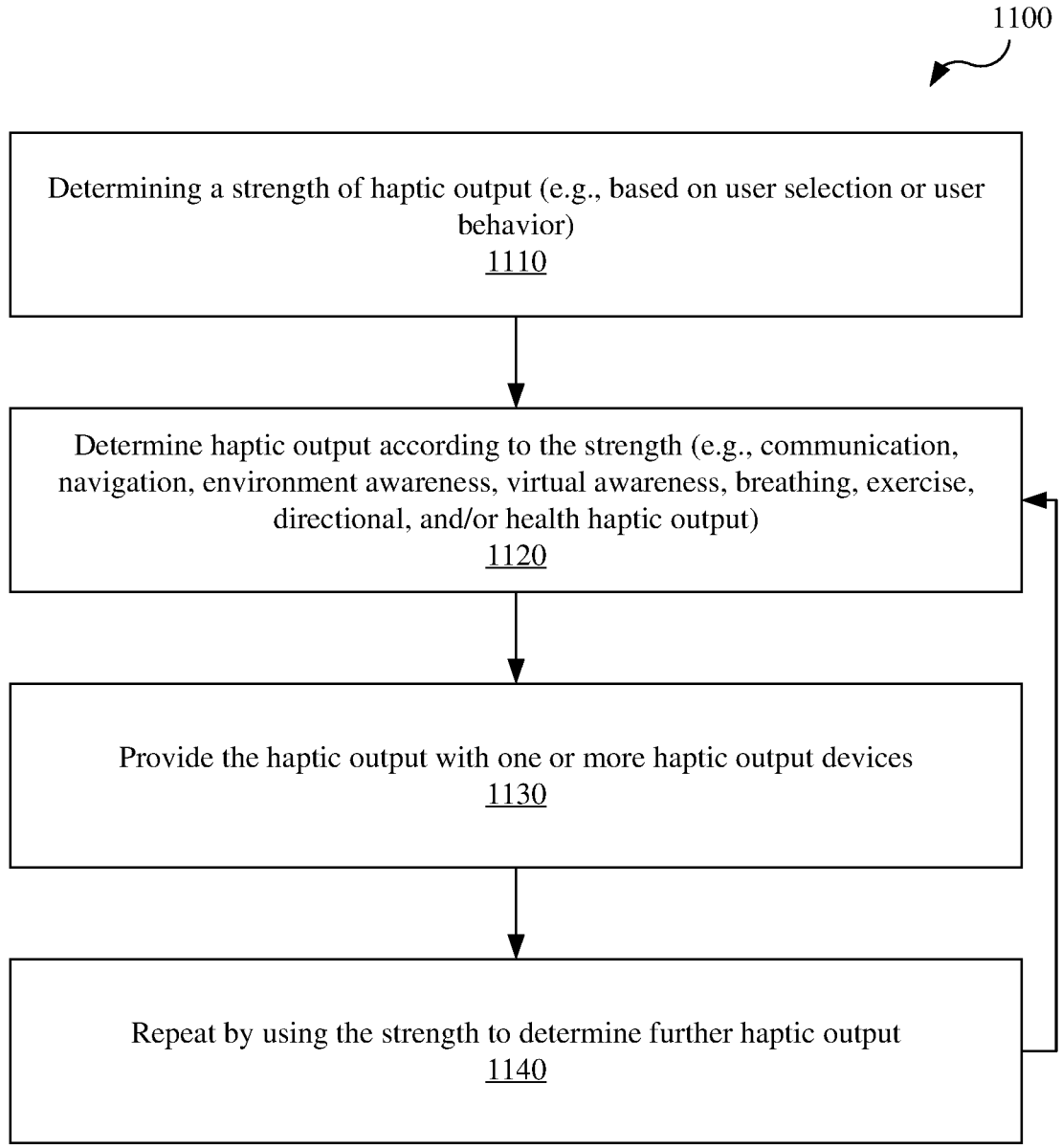
FIG. 11 is a flow diagram of a method for adjusting haptic output of the head-mounted display.

Referring to FIG. 11, according to the haptic adjustment module 324G, the haptic output provided according to any of the other haptic modules 324 disclosed herein may be adjusted. For example, a user may have thick hair that reduces sensitivity to the haptic output in which case stronger (e.g., higher magnitude) haptic output may be warranted. Alternatively, a user may simply prefer weaker haptic output. In one implementation, the user may select the strength of the haptic output. Instead or additionally, the head-mounted display may determine the strength of the haptic output, for example, increasing the strength of the haptic output if the user is not responsive to the haptic output at lower strengths (e.g., does not turn their head in response to the haptic output). The haptic adjustment module 324G may be provided within another of the haptic modules 324, or may function as a secondary haptic output module (as described above) in which case the determined haptic output of the other haptic modules 324 (e.g., 324A, 324B, 324C, 324D, 324E, 324F) function as the input 310 to the haptic adjustment module 324G.

A method 1100 is provided for adjusting the strength of the haptic output. The method 1100 generally includes determining 1110 a strength of the haptic output, determining 1120 the haptic output according to the strength, providing 1130 the haptic output, and repeating the determining 1120 and the providing 1130 according to the determining 1120 of the strength.

The determining 1110 of the strength of the haptic output is performed with the controller 116 or other processing apparatus in conjunction with the sensors 122 and/or the communications interface 124. In one implementation, the user specifies the strength of the haptic output (e.g., a relative strength such as a low, normal, or high), which may be received by the head-mounted display 100, for example, as a voice command e.g., with the audio sensor 122e) or as an input from the user device 128a (e.g., via the communications interface 124). Instead or additionally, the head-mounted display 100 determines the strength of the haptic output (e.g., a relative strength), for example, by changing the strength of the haptic output until the user is responsive to the haptic output (e.g., consistently moves their head in close time proximity to the haptic output at a given strength).

The repeating 1140 of the steps 1120, 1130 are repeated, for example, to provide haptic output according to the strength, for example, during continued use of one of the haptic output modules 324 or when using another haptic output module 324.

The determining 1120 of the haptic output is performed with the controller 116 or other processing apparatus according the determining 1120 of the strength. For example, the haptic output may be determined as described for each of the other haptic modules 324 previously described with the magnitude thereof being reduced or increased relative to a normal level according to the strength previously determined. For example, the communication, navigation, environment awareness, virtual awareness, breathing, exercise, directional, and/or health haptic output as determined by the other haptic modules 324 may be adjusted upward or downward according to the determining 1110 of the strength.

The providing 1130 of the haptic output is performed with the haptic output devices 118 as controlled by the controller 116 or other processing apparatus.

Referring to FIGS. 3-11, it should be understood that the various haptic output modules 324 may be used in any suitable combination with each other (e.g., the methods thereof being implemented concurrently with each other). In such cases, the various haptic outputs thereof may have different haptic output patterns, whereby the user can distinguish between the different haptic output. For example, the communications module 324A, the navigation module 324B, and the environmental awareness module 324C may be used concurrently, whereby the communication haptic output, the navigation haptic output, and the environment haptic output all have different haptic output patterns. Similarly, the communications module 324A, the environmental awareness module 324C, and the exercise module 324F may be used concurrently, whereby the communication haptic output, the environment haptic output, and the exercise haptic output all have different haptic output patterns.

A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

In contrast, a computer-generated reality (CGR) environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a CGR environment may be made in response to representations of physical motions (e.g., vocal commands).

A person may sense and/or interact with a CGR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects.

Examples of CGR include virtual reality and mixed reality.

A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end.

In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationery with respect to the physical ground.

Examples of mixed realities include augmented reality and augmented virtuality.

An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment.

An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

An augmented virtuality (AV) environment refers to a simulated environment in which a virtual or computer generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

There are many different types of electronic systems that enable a person to sense and/or interact with various CGR environments. Examples include head mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mounted system may have one or more speaker(s) and an integrated opaque display. Alternatively, a head mounted system may be configured to accept an external opaque display (e.g., a smartphone). The head mounted system may incorporate one or more imaging sensors to capture images or video of the physical environment, and/or one or more microphones to capture audio of the physical environment. Rather than an opaque display, a head mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

As described above, one aspect of the present technology is the gathering and use of data available from various sources provide haptic output to the user. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to provide haptic output, such as for accessibility. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of providing haptic output, the present technology can be configured to allow users to select to "opt in" or "opt out" of participation in the collection of personal information data during registration for services or anytime thereafter. In another example, users can select not to provide accessibility information or other personal information for providing the haptic output. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data at a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, haptic output can be selected and delivered to users by inferring preferences based on non-personal information data or a bare minimum amount of personal information, such as the content being requested by the device associated with a user, other non-personal information, or publicly available information.

What is claimed is:

1. A head-mounted display comprising:
a display unit configured to be worn on a head of a user and having a display for providing graphical output to the user;
a head support mechanically and electrically coupled to the display unit;
haptic output devices including:
a front haptic output device configured for contact with a forward part of the head of the user and coupled to the display unit; and
a back haptic output device configured for contact with a rear part of the head of the user and coupled to the head support;
wherein the front haptic output device and the back haptic output device are interchangeable with each other and provide a same type of haptic output; and
a controller that processes directional inputs, determines a directional haptic output according to the directional inputs, and controls the haptic output devices to provide the directional haptic output to the front haptic output device or the back haptic output device according to the directional inputs,
wherein the directional inputs include navigation instructions, and the directional haptic output provides the navigation instructions to the user.

2. The head-mounted display according to claim 1, wherein:
the haptic output devices include a left haptic output device and a right haptic output device, the directional haptic output includes a left haptic output and a right haptic output, and the controller controls the left haptic output device to provide the left haptic output and the right haptic output device to provide the right haptic output; and the directional inputs include one or more of navigation instructions determined according to a position sensor of the head-mounted display or an environmental feature of interest determined according to an environmental sensor sensing an object in an environment of the head-mounted display.

3. The head-mounted display according to claim 1, wherein the haptic output devices include a left haptic output device and a right haptic output device, the directional haptic output includes a left haptic output and a right haptic output, and the controller controls the left haptic output device to provide the left haptic output and the right haptic output device to provide the right haptic output.

4. The head-mounted display according to claim 3, wherein the directional haptic output includes a back haptic output that is generated by the back haptic output device, and the controller controls the back haptic output device to provide the back haptic output.

5. The head-mounted display according to claim 4, wherein the directional haptic output includes a front haptic output that is generated by the front haptic output device, and the controller controls the front haptic output device to provide the front haptic output.

6. The head-mounted display according to claim 1, further comprising a position sensor according to which the navigation instructions are determined for reaching a destination.

7. The head-mounted display according to claim 1, wherein the directional inputs include an environmental feature of interest that is an object in an environment in which the head-mounted display is positioned, and the directional haptic output indicates a direction in which the environmental feature of interest is located relative to the user.

8. The head-mounted display according to claim 7, further comprising an environmental sensor, and the environmental feature of interest is determined by the controller according to the environmental sensor sensing the object.

9. The head-mounted display according to claim 1, wherein the directional inputs include a virtual output of interest that is at least one of the graphical output or an aural output of the head-mounted display, and the directional haptic output indicates a direction in which the virtual output of interest is located within a virtual environment.

10. The head-mounted display according to claim 9, wherein the at least one of the graphical output or the aural output includes the virtual environment, and the controller processes the graphical output or the aural output to determine the virtual output of interest within the virtual output.

* * * * *